(12) United States Patent
Yoshimura et al.

(10) Patent No.: US 8,033,918 B2
(45) Date of Patent: Oct. 11, 2011

(54) DAMPER MECHANISM

(75) Inventors: Yoshinari Yoshimura, Ikoma (JP);
Hiroshi Uehara, Hirakata (JP)

(73) Assignee: Exedy Corporation, Osaka (JP)

( * ) Notice: Subject to any disclaimer, the term of this patent is extended or adjusted under 35 U.S.C. 154(b) by 270 days.

(21) Appl. No.: 12/445,445

(22) PCT Filed: Oct. 24, 2007

(86) PCT No.: PCT/JP2007/070689
§ 371 (c)(1),
(2), (4) Date: Apr. 13, 2009

(87) PCT Pub. No.: WO2008/065833
PCT Pub. Date: Jun. 5, 2008

(65) Prior Publication Data
US 2010/0075763 A1 Mar. 25, 2010

(30) Foreign Application Priority Data

Nov. 27, 2006 (JP) ................. 2006-319181

(51) Int. Cl.
*F16F 15/129* (2006.01)
(52) U.S. Cl. .................................. 464/68.41
(58) Field of Classification Search ............ 464/68.1,
464/68.4, 68.41, 68.6; 192/30 V, 55.61,
192/70.17, 204, 213.11, 213.12, 213.21–214.1
See application file for complete search history.

(56) References Cited

U.S. PATENT DOCUMENTS

| | | | | | |
|---|---|---|---|---|---|
| 2,764,004 | A | * | 9/1956 | Myers | 464/68.41 |
| 3,387,505 | A | | 6/1968 | Rumsey | |
| 4,301,907 | A | * | 11/1981 | Carpenter et al. | 464/68.41 |
| 4,496,036 | A | | 1/1985 | Loizeau | |
| 4,537,295 | A | * | 8/1985 | Fadler et al. | 464/68.41 |
| 4,588,062 | A | * | 5/1986 | Caray et al. | 464/68.41 |
| 4,679,679 | A | * | 7/1987 | Lech et al. | 464/68.41 |
| 4,883,156 | A | * | 11/1989 | Rohrle et al. | 464/68.41 |
| 5,769,721 | A | * | 6/1998 | Tauvron et al. | 464/68.41 |
| 5,954,585 | A | * | 9/1999 | Nagano et al. | 464/68.41 |
| 6,050,383 | A | * | 4/2000 | Hashimoto et al. | 464/68.41 |
| 6,056,103 | A | * | 5/2000 | Hashimoto et al. | 464/68.41 |
| 6,227,977 | B1 | * | 5/2001 | Tanaka et al. | 464/68.6 |
| 6,270,417 | B1 | * | 8/2001 | Hashimoto | 464/68.41 |
| 6,659,876 | B2 | | 12/2003 | Hashimoto | |
| 6,789,655 | B2 | * | 9/2004 | Hashimoto et al. | 192/70.17 |
| 2003/0045362 | A1 | * | 3/2003 | Aoki et al. | 464/68.4 |

FOREIGN PATENT DOCUMENTS

| | | |
|---|---|---|
| JP | S57-107436 A | 7/1982 |
| JP | 2002-266943 A | 9/2002 |
| JP | 2002-372101 A | 12/2002 |

* cited by examiner

*Primary Examiner* — Gregory Binda
*Assistant Examiner* — Josh Skroupa
(74) *Attorney, Agent, or Firm* — Global IP Counselors, LLP

(57) ABSTRACT

A damper mechanism 4 has an input rotary member 2, a hub flange 6, a large coil spring 8 and a friction generating mechanism 5. In a state in which the input rotary member 2 is twisted to one side in the rotational direction with respect to the hub flange 6, the friction member is pressed in the rotational direction against the hub flange 6 in a state in which at least part of the friction member has been elastically deformed in the relational direction, so that the friction member and the hub flange 6 function as an integral member in the rotational direction. In a state in which the input rotary member 2 is twisted to one side in the rotational direction with respect to the hub flange 6, the friction member is capable of relative rotation with respect to the hub flange.

20 Claims, 20 Drawing Sheets

DAMPER MECHANISM

TECHNICAL FIELD

The present invention relates to a damper mechanism, and more particularly relates to a damper mechanism for damping torsional vibration in a power transmission system.

BACKGROUND OF THE INVENTION

A clutch disk assembly used in a vehicle has a clutch function for engaging with and disengaging from a flywheel, and a damper function for absorbing and damping torsional vibration from the flywheel. Typical vibrations encountered with vehicles include idling noises (clattering), driving noises (acceleration and deceleration rattling, muffled noises), and tip-in and tip-out (low-frequency vibrations). The damper function eliminates these noises and vibrations.

Idling noises are those that sound like a clattering generated from the transmission when the shifter is put into neutral at a stoplight or the like, and the clutch pedal is released. The cause of these noises is that the engine torque is low, and torque fluctuates considerably during engine combustion near the engine idle speed. At such times the input gear and counter gear of the transmission clash.

Tip-in and tip-out (low-frequency vibrations) are large vibrations along the length of the chassis, produced when the accelerator pedal is suddenly pressed or released. If the power transmission system is low in stiffness, torque transmitted to the tires will be transmitted back from the tires, and this reverberation generates excessive torque at the tires, and this results in longitudinal vibration that strongly shakes the chassis back and forth transiently.

With idling noises, close to zero torque is problematic in the torsional characteristics of the clutch disk assembly, and it is therefore better for the torsional stiffness to be low. On the other hand, with tip-in and tip-out longitudinal vibration, the torsional characteristics of the clutch disk assembly must be made as solid as possible.

To solve the above problem, a clutch disk assembly has been proposed in which two-stage characteristics are attained by using two types of spring members. Here, torsional stiffness and hysteresis torque are kept low in the first stage of the torsional characteristics (the region of low torsion angle), which is effective in preventing noises during idling. Since the torsional stiffness and the hysteresis torque are kept high in the second stage of the torsional characteristics (the region of high torsion angle), tip-in and tip-out longitudinal vibration can be sufficiently damped.

Furthermore, there is a known damper mechanism with which minute torsional vibrations are effectively absorbed without operating a large friction mechanism for the second stage when the minute torsional vibrations are inputted, such as those caused by combustion fluctuation in the engine, in the second stage of the torsional characteristics.

In order for no large friction mechanism to be operated for the second stage when the minute torsional vibrations are inputted, such as those caused by combustion fluctuation in the engine, in the second stage of the torsional characteristics, it is necessary to ensure a gap of a specific angle in the rotational direction between a spring member with high torsional stiffness and the large friction mechanism in a state in which the spring member with high torsional stiffness has been compressed.

The angle of this gap in the rotational direction is very small (only about 0.2° to 1.0°, for example), and it is present at both the second stage on the positive side, where an input plate (input rotary member) is twisted to the drive side in the rotational direction (positive side) with respect to a spline hub (output rotary member), and the second stage on the negative side, where the twist is to the opposite side (negative side).

In particular, since the structure constituting the gap in the rotational direction was achieved in the past by the same mechanism at both the positive second stage and the negative second stage, this rotational direction gap was always generated on both the positive and negative sides of the torsional characteristics, and furthermore the magnitude of the angle was the same.

However, there are cases when it is preferable for the size of the rotational direction gap to be different on the positive and negative sides of the torsional characteristics, according to the characteristics of the vehicle, and it is also conceivable that it might even be preferable not to provide the above-mentioned rotational direction gap on one side of the torsional characteristics.

More specifically, on the negative side of the torsional characteristics, the above-mentioned rotational direction gap is necessary in order to lower the peak of vibration at the resonant rotational speed during deceleration. However, with a front-wheel drive vehicle, a resonance peak often remains in the practical rotational speed band, and if the above-mentioned rotational direction gap is ensured on the positive side of the torsional characteristics, this will adversely affect the noise and vibration performance near the resonant rotational speed.

In view of this, a damper mechanism has been proposed that has a gap for generating low hysteresis torque with respect to minute torsional vibration on only the negative side of the torsional characteristics (see Japanese Laid-Open Patent Application 2002-266943, for example).

However, to obtain a structure having a low hysteresis torque generating gap on just one side of the torsional characteristics, many extremely small friction washers or cone springs are necessary. Accordingly, the number of parts increases, and assembling the parts entails more labor. Specifically with a conventional damper mechanism, employing the above-mentioned structure drives up the manufacturing cost.

SUMMARY OF THE INVENTION

It is an object of the present invention to lower the manufacturing cost of a damper mechanism having a gap for generating low hysteresis torque with respect to the desired torsional vibration.

A damper mechanism according to a first aspect includes a first rotary member, a second rotary member, an elastic member, and a friction generating mechanism. The second rotary member is disposed rotatably within a range of a first angle with respect to the first rotary member. The elastic member elastically links the first and second rotating bodies in the rotational direction. The friction generating mechanism is disposed between the first and second rotating bodies and has a friction member that frictionally engages with the first rotary member. In a state in which the first rotary member is twisted to one side in the rotational direction with respect to the second rotary member, the friction member is pressed in the rotational direction against the second rotary member in a state in which at least part of the friction member has been elastically deformed in the rotational direction, so that the friction member and the second rotary member function as an integral member in the rotational direction. In a state in which the first rotary member is twisted to one side in the rotational direction with respect to the second rotary member, the friction member is capable of relative rotation with respect to the second rotary member within a range of a second angle that is smaller than the first angle.

With this damper mechanism, for example, when torque is inputted to one side in the rotational direction with respect to the first rotary member, the first rotary member rotates to one side in the rotational direction with respect to the second rotary member. As a result, the elastic member is compressed between the first rotary member and the second rotary member. Once the relative torsional angle of the first rotary member and the second rotary member reaches a first angle, the first rotary member and the second rotary member rotate integrally to one side in the rotational direction. Thus, torsional vibration inputted to the first rotary member is damped and absorbed, and torque is transmitted from the first rotary member to the second rotary member.

Here, in a state in which the first rotary member is twisted to one side in the rotational direction with respect to the second rotary member, the friction member is pressed in the rotational direction against the second rotary member in a state in which at least part of the friction member has been elastically deformed in the rotational direction. That is, the friction member and the second rotary member function as an integral member in the rotational direction under the elastic force of the friction member. Accordingly, when a minute torsional vibration is inputted to the first rotary member in this state, frictional resistance is generated between the first rotary member and the friction member, which generates hysteresis torque.

Meanwhile, in a state in which the first rotary member is twisted to one side in the rotational direction with respect to the second rotary member, the friction member is capable of relative rotation with respect to the second rotary member within a range of a second angle. Accordingly, no frictional resistance is generated between the first rotary member and the friction member, so no hysteresis torque is generated.

Thus, with this damper mechanism, a constitution can be achieved in which the elastic force of the friction member is utilized to generate hysteresis torque in all of the torsional vibration on one side of the torsional characteristics, and the generation of hysteresis torque can be prevented within a specific range of torsional angle on the other side of the torsional characteristics. Consequently, with this damper mechanism, the structure can be simplified and the manufacturing cost lowered.

A damper mechanism according to a second aspect is the damper mechanism according to the first aspect, wherein the friction member has a first annular component that is disposed rotatably with respect to the second rotary member within a range of a second angle that is smaller than the first angle, a second annular component that is disposed rotatably with respect to the first annular component, and a linking component that elastically links the first and second annular components in the circumferential direction. In a state in which the first rotary member is twisted to one side in the rotational direction with respect to the second rotary member, the linking component is elastically deformed in the rotational direction between the first annular component and the second annular component.

A damper mechanism according to a third aspect is the damper mechanism according to the second aspect, further including a third rotary member disposed so as to be capable of relative rotation with respect to the second rotary member. In a state in which the first rotary member is twisted to one side in the rotational direction with respect to the third rotary member, the first annular component is pushed to one side in the rotational direction by the second rotary member, and the second annular component is pushed to the other side in the rotational direction by the third rotary member.

A damper mechanism according to a fourth aspect is the damper mechanism according to the third aspect, wherein, in a neutral state in which no torque is inputted, the second rotary member is capable of rotating with respect to the third rotary member within a range of a third angle to one side in the rotational direction. In a state in which the relative rotation of the first annular component to the other side in the rotational direction with respect to the second rotary member is limited, the second annular component is capable of rotating by a fourth angle that is smaller than the third angle to one side in the rotational direction with respect to the second rotary member.

A damper mechanism according to a fifth aspect is the damper mechanism according to any of the second to fourth aspects, wherein the second rotary member has a hole passing through in the axial direction. The first annular component has a protrusion that protrudes in the axial direction and that is inserted into the hole. The second angle is maintained in the rotational direction between the hole and the protrusion.

A damper mechanism according to a sixth aspect is the damper mechanism according to any of the second to fifth aspects, wherein the second rotary member has an annular first main body component and a plurality of first inner peripheral teeth extending inward in the radial direction from the first main body component. The third rotary member has an annular second main body component and a plurality of outer peripheral teeth extending outward in the radial direction from the second main body component. The second annular component has a plurality of second inner peripheral teeth extending inward in the radial direction. In a neutral state in which no torque is inputted, the third angle is maintained in the rotational direction between the first inner peripheral teeth and the outer peripheral teeth. The fourth angle is maintained in the rotational direction between the second inner peripheral teeth and the outer peripheral teeth.

A damper mechanism according to a seventh aspect is the damper mechanism according to any of the second to sixth aspects, wherein the first annular component is disposed on the outer peripheral side of the second annular component. The linking component has a deformation component extending from the inner peripheral part of the first annular component to the outer peripheral part of the second annular component.

A damper mechanism according to an eighth aspect is the damper mechanism according to the seventh aspect, wherein the deformation component has a curved component that is curved in a wave shape.

A damper mechanism according to a ninth aspect is the damper mechanism according to any of the second to eighth aspects, wherein the linking component is formed integrally with the first and/or second annular component.

A damper mechanism according to a tenth invention is the damper mechanism according to any of the second to ninth aspects, wherein the friction member further has a friction plate that is disposed so as to be capable of relative movement in the axial direction and capable of rotating integrally with the first annular component, and that frictionally engages with the first rotary member.

DETAILED DESCRIPTION OF THE PREFERRED EMBODIMENTS

An embodiment of the damper mechanism pertaining to the present invention will now be described with reference to the drawings. An example of a clutch disk assembly in which a damper mechanism is installed will be described as an example here.

1. Overall Configuration of Clutch Disk Assembly

Figure 1:
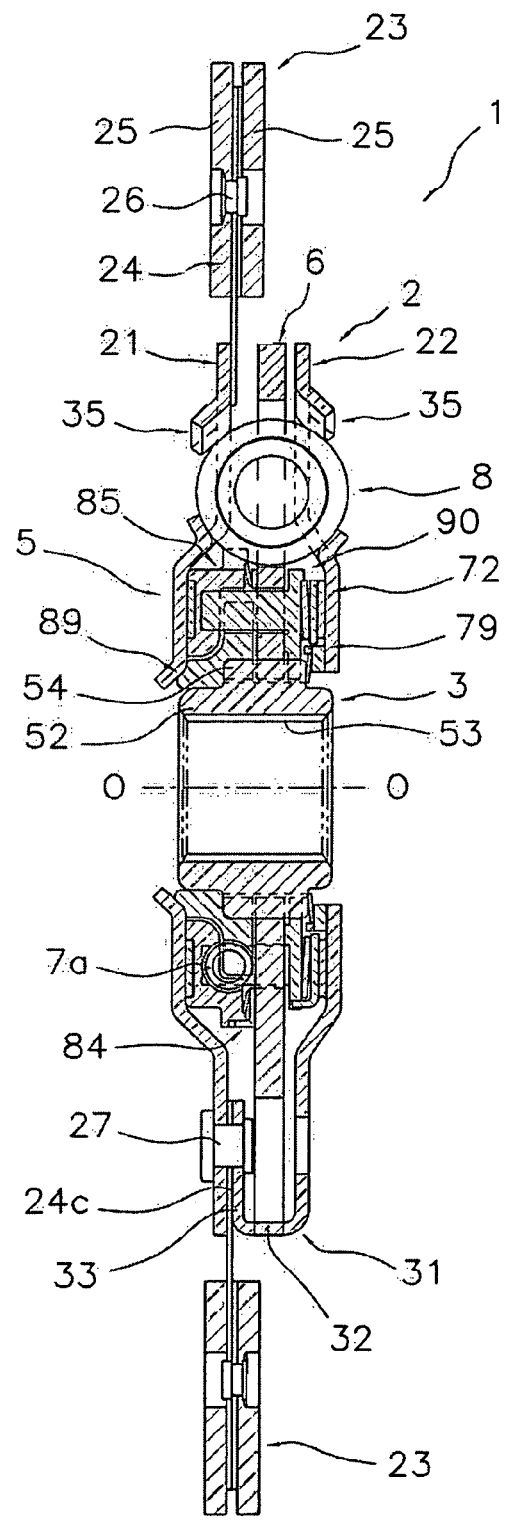
FIG. 1 is a simplified vertical cross section of a clutch disk assembly.
Figure 2:
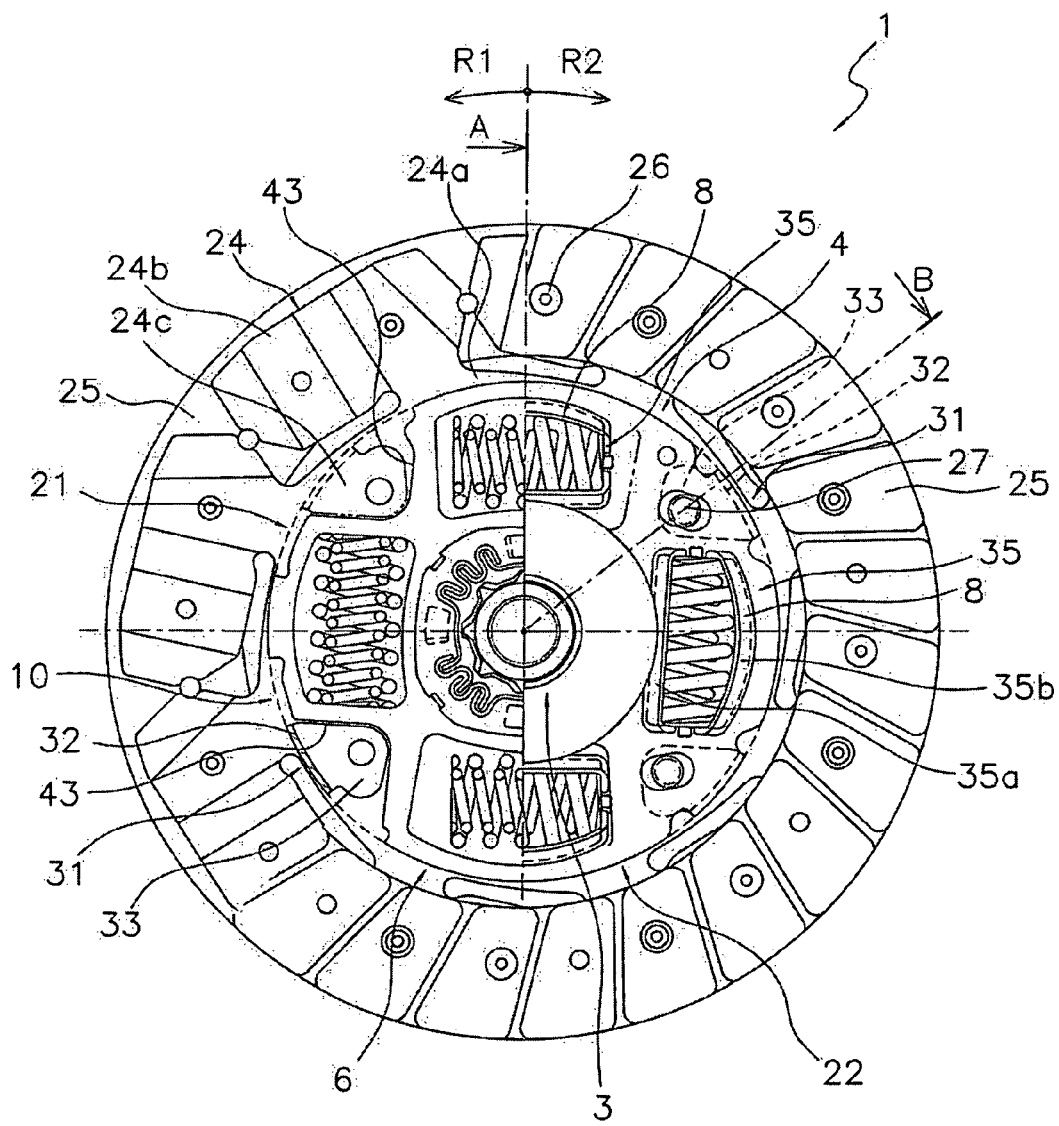
FIG. 2 is a simplified elevational view of a clutch disk assembly.

A clutch disk assembly 1 in which a damper mechanism 4 according to the present invention has been installed will be described through reference to FIG. 1 or 2. FIG. 1 is a simplified vertical cross section of the clutch disk assembly 1, and FIG. 2 is a simplified elevational view of the clutch disk assembly 1. The O-O line in FIG. 1 is the rotational axis of the clutch disk assembly 1. Also, an engine and a flywheel (not shown) are disposed on the left side in FIG. 1, and a transmission (not shown) is disposed on the right side in FIG. 1. Further, the R1 side in FIG. 2 is the rotational direction drive side (positive side) of the clutch disk assembly 1, while the R2 side is the opposite side (negative side).

The clutch disk assembly 1 is a mechanism used in a clutch device that constitutes part of a power transmission system in a vehicle, and has a clutch function and a damper function. The clutch function is to transmit and to shut off torque by using a pressure plate (not shown) to press the clutch disk assembly 1 against, or release it from, the flywheel (not shown). The damper function is to absorb and to damp torsional vibration inputted from the flywheel side by means of coil springs or the like.

As shown in FIGS. 1 and 2, the clutch disk assembly 1 mainly has a clutch disk 23 to which torque is inputted from the flywheel by frictional engagement, and a damper mechanism 4 that absorbs and damps torsional vibration inputted from the clutch disk 23.

The clutch disk 23 is the portion that is pressed against the fly wheel (not shown), and mainly has a pair of annular friction facings 25 and a cushioning plate 24 to which the friction facings 25 are fixed. The cushioning plate 24 has an annular component 24a, eight cushioning components 24b provided on the outer peripheral side of the annular component 24a and aligned in the rotational direction, and four fixed components 24c extending inward in the radial direction from the annular component 24a. The friction facings 25 are fixed by rivets 26 to both sides of the cushioning components 24b. The fixed components 24c are fixed to the outer peripheral part of the damper mechanism 4.

2. Configuration of Damper Mechanism 2.1 Summary of Damper Mechanism

Figure 11:
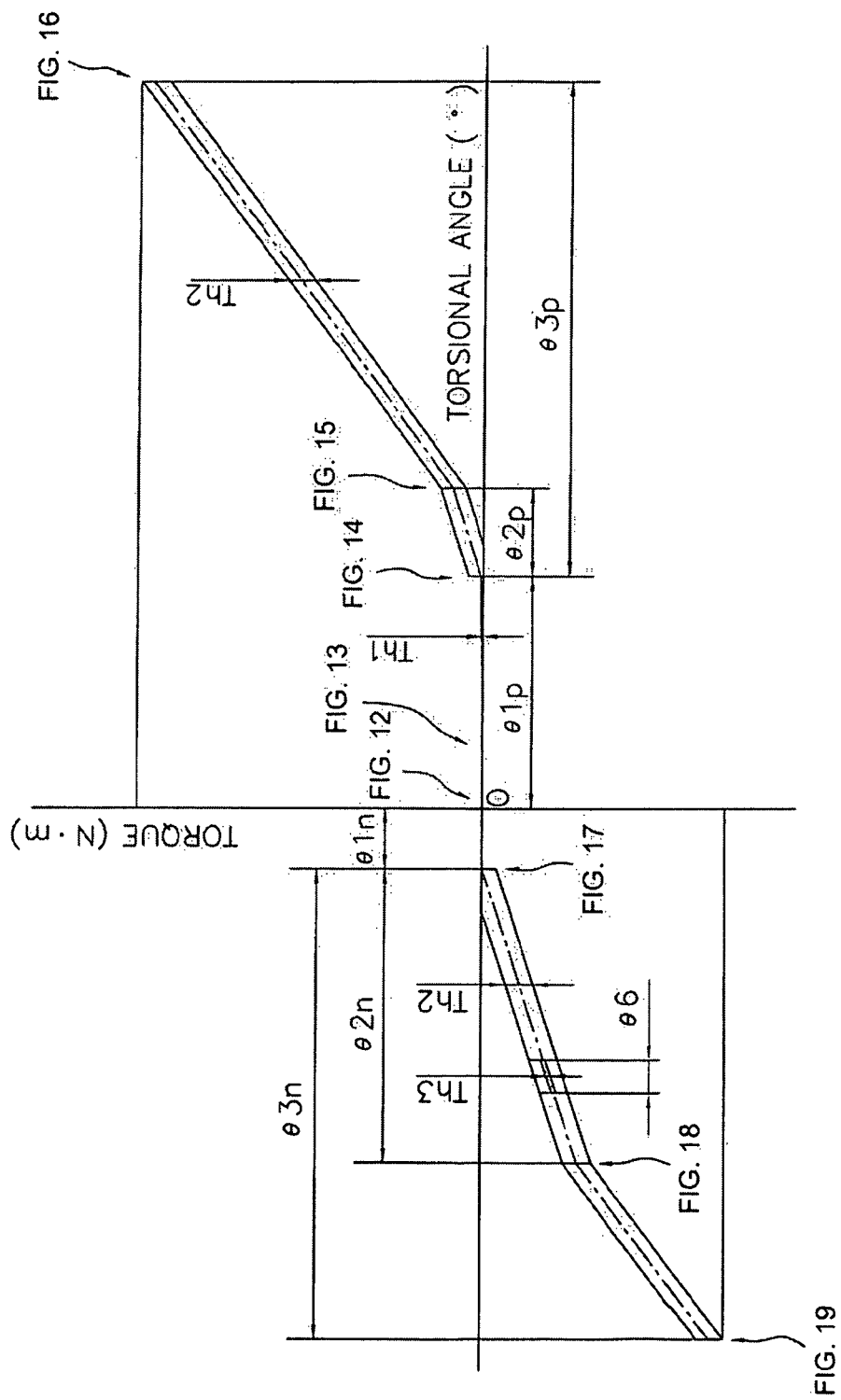
FIG. 11 is a graph of the torsional characteristics of a damper mechanism.

The damper mechanism 4 has the torsional characteristics shown in FIG. 11 in order to damp and to absorb effectively torsional vibration transmitted from the engine. More specifically, the torsional characteristics of the damper mechanism 4 have four-stage characteristics on the positive side, and three-stage characteristics on the negative side. On the positive side of the torsional characteristics, the first and second stage regions (torsion angle of 0 to $\theta 1p$) are regions of low torsional stiffness and low hysteresis torque, and the third and fourth stage regions (torsion angle of $\theta 1p$ to $\theta 1p+\theta 3p$) are regions of high torsional stiffness and high hysteresis torque. On the negative side of the torsional characteristics, the first stage region (torsion angle of 0 to $\theta 1n$) is a region of low torsional stiffness and low hysteresis torque, and the second and third stage regions (torsion angle of $\theta 1n$ to $\theta 1n+\theta 3n$) are regions of high torsional stiffness and high hysteresis torque. Due to these torsional characteristics, the damper mechanism 4 can effectively damp and absorb torsional vibration, such as idling noises, tip-in and tip-out (low-frequency vibrations), etc.

Also, with this damper mechanism 4, a rotational direction gap (gap angle of $\theta 6$) for preventing the generation of high hysteresis torque only on the negative side of the torsional characteristics is provided in order to damp and to absorb minute torsional vibrations. The reason for not providing a rotational direction gap on the positive side of the torsional characteristics is to prevent the generation of a resonance peak on the positive side of the torsional characteristics.

2.2: Configuration of Damper Mechanism

Figure 3:
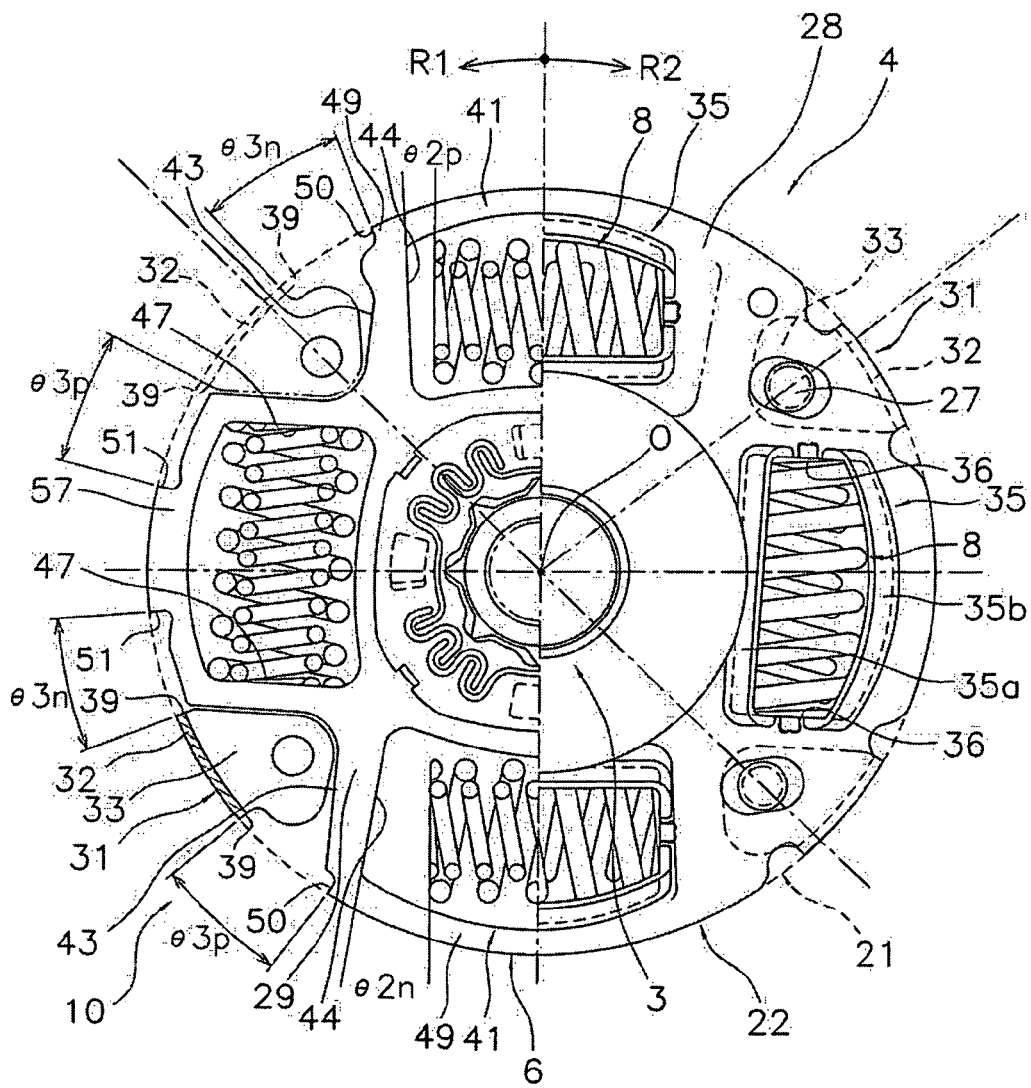
FIG. 3 is a simplified elevational view of a damper mechanism.
Figure 4:
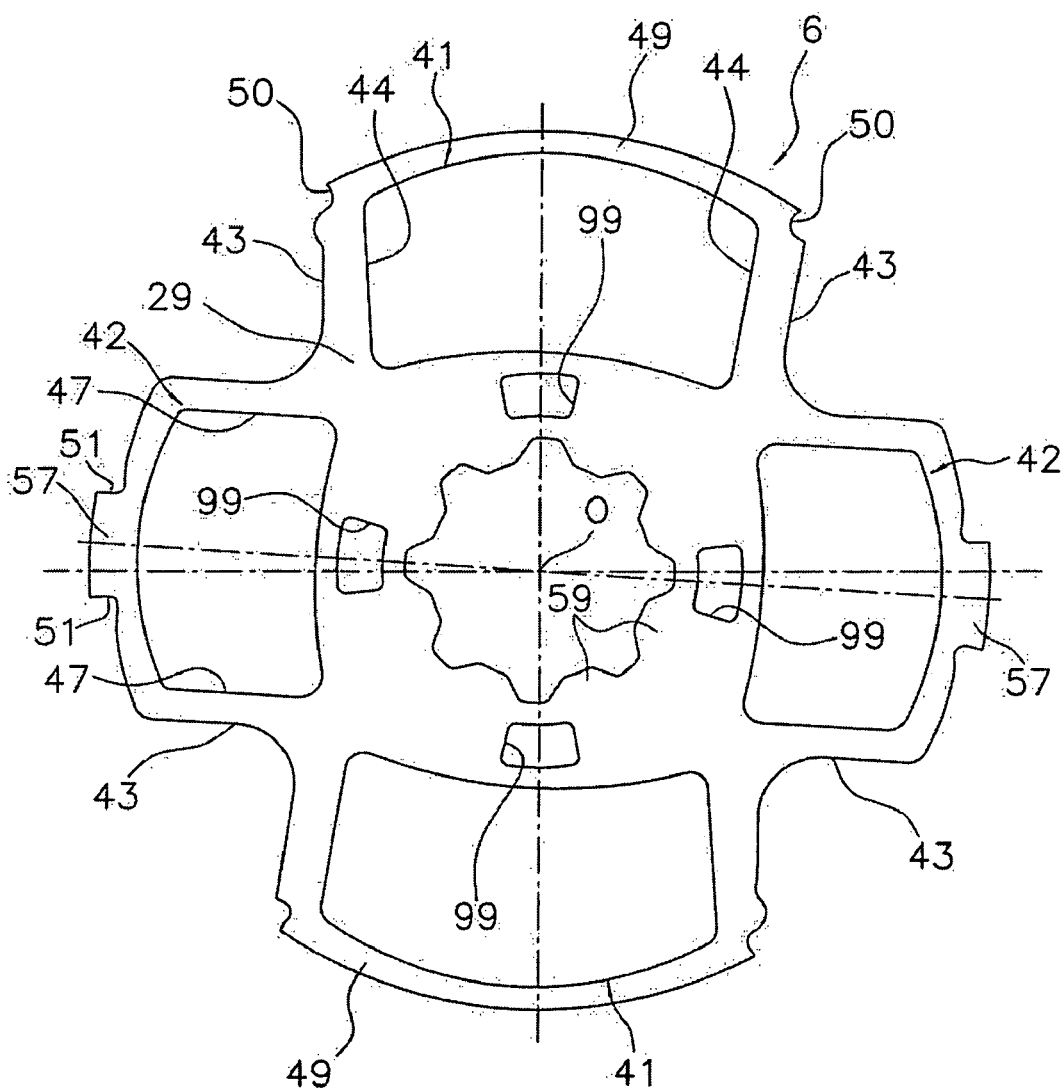
FIG. 4 is a simplified elevational view of a hub flange.
Figure 5:
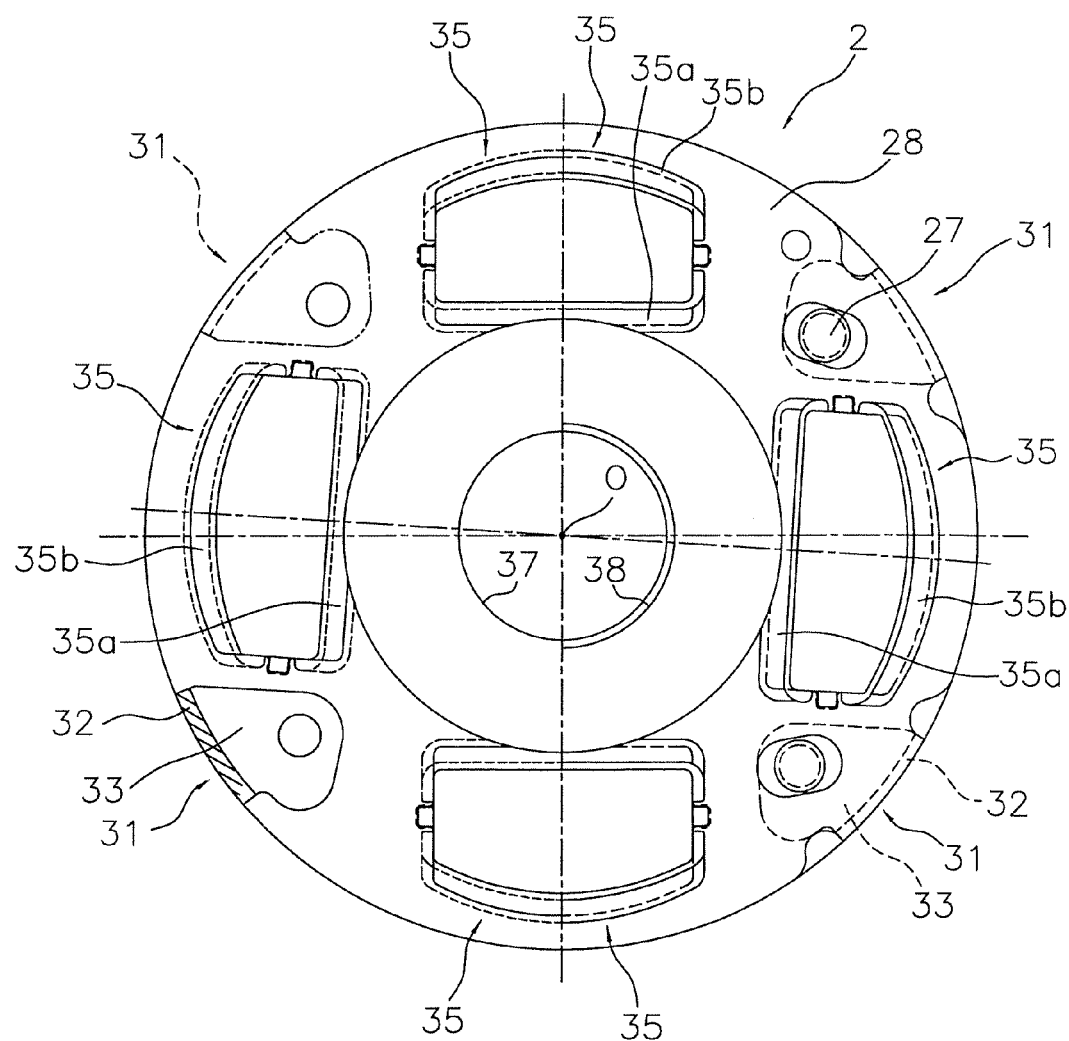
FIG. 5 is a simplified elevational view of an input rotary member.
Figure 6:
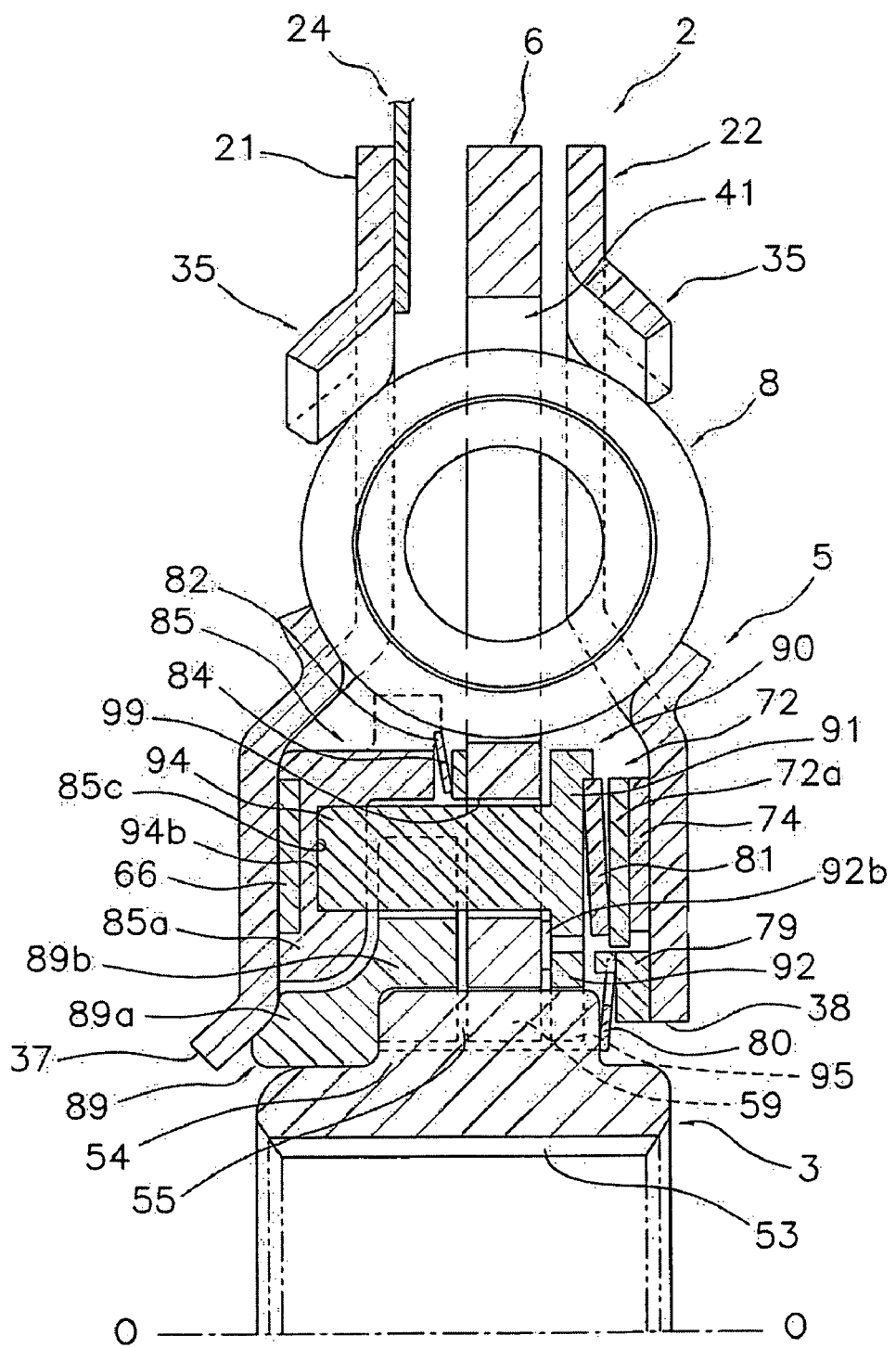
FIG. 6 is a partial cross section of a damper mechanism (cross section A in FIG. 2)
Figure 7:
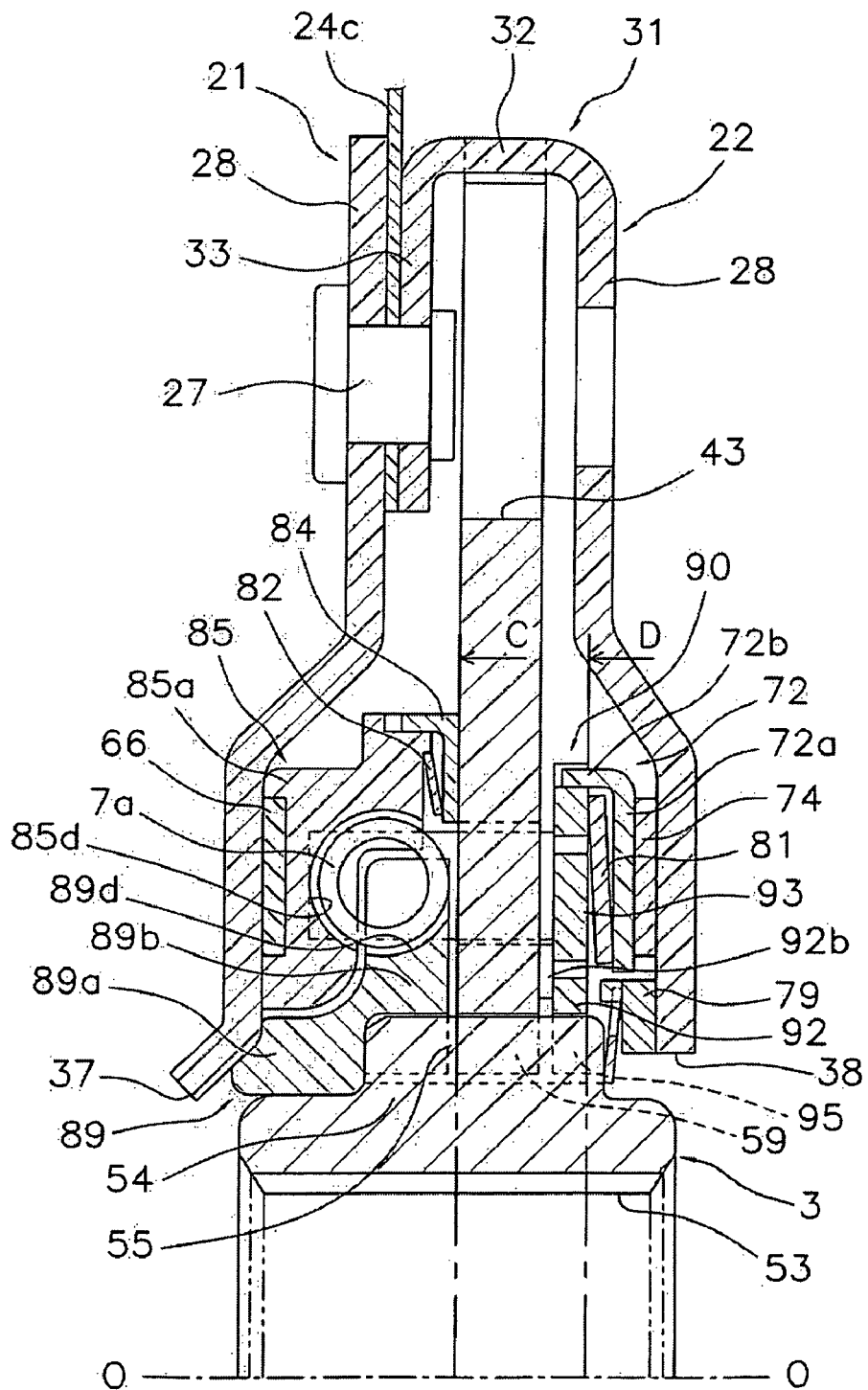
FIG. 7 is a partial cross section of a damper mechanism (cross section B in FIG. 2)
Figure 8:
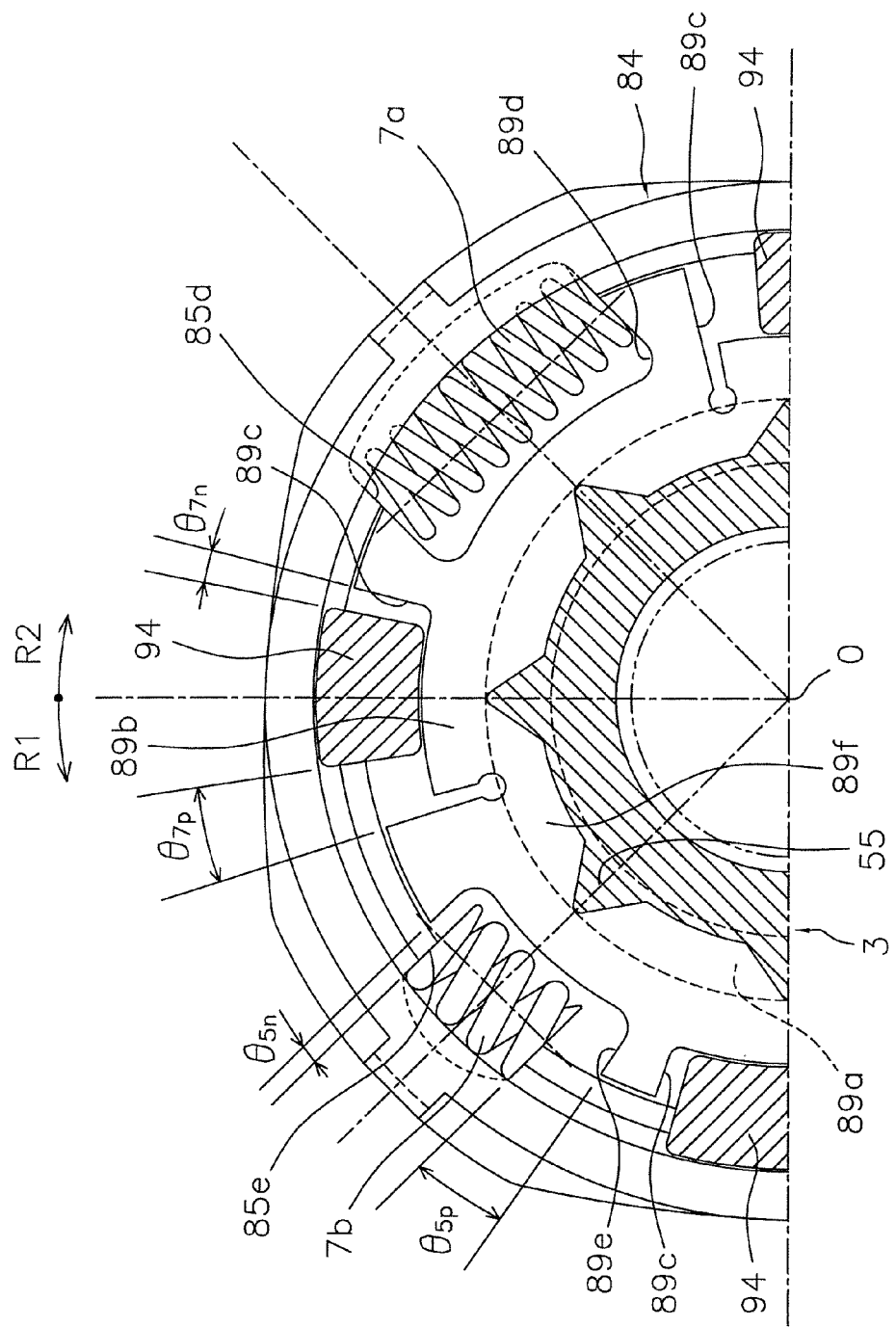
FIG. 8 is a partial elevational view of a damper mechanism (cross section C in FIG. 2)
Figure 9:
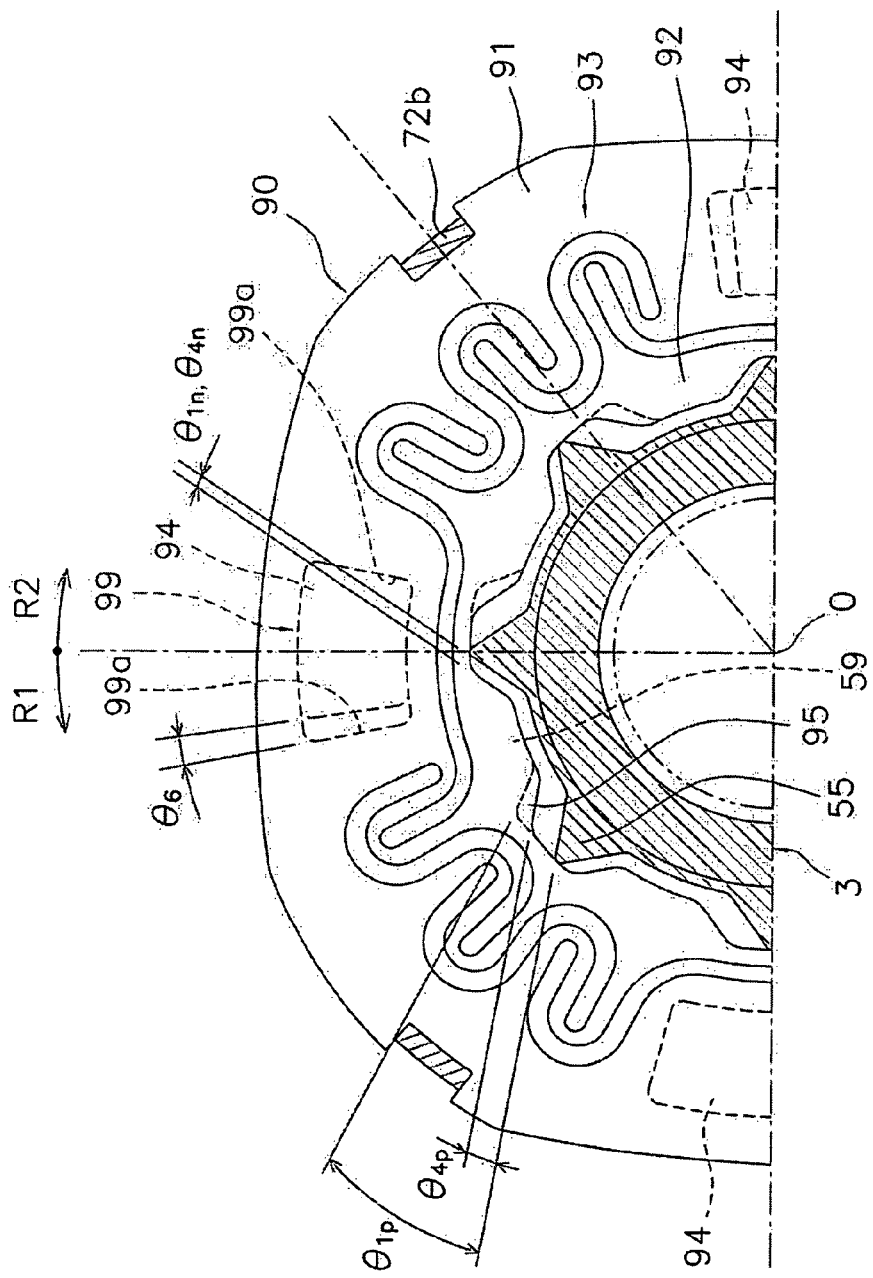
FIG. 9 is a partial elevational view of a damper mechanism (cross section D in FIG. 2)
Figure 10:
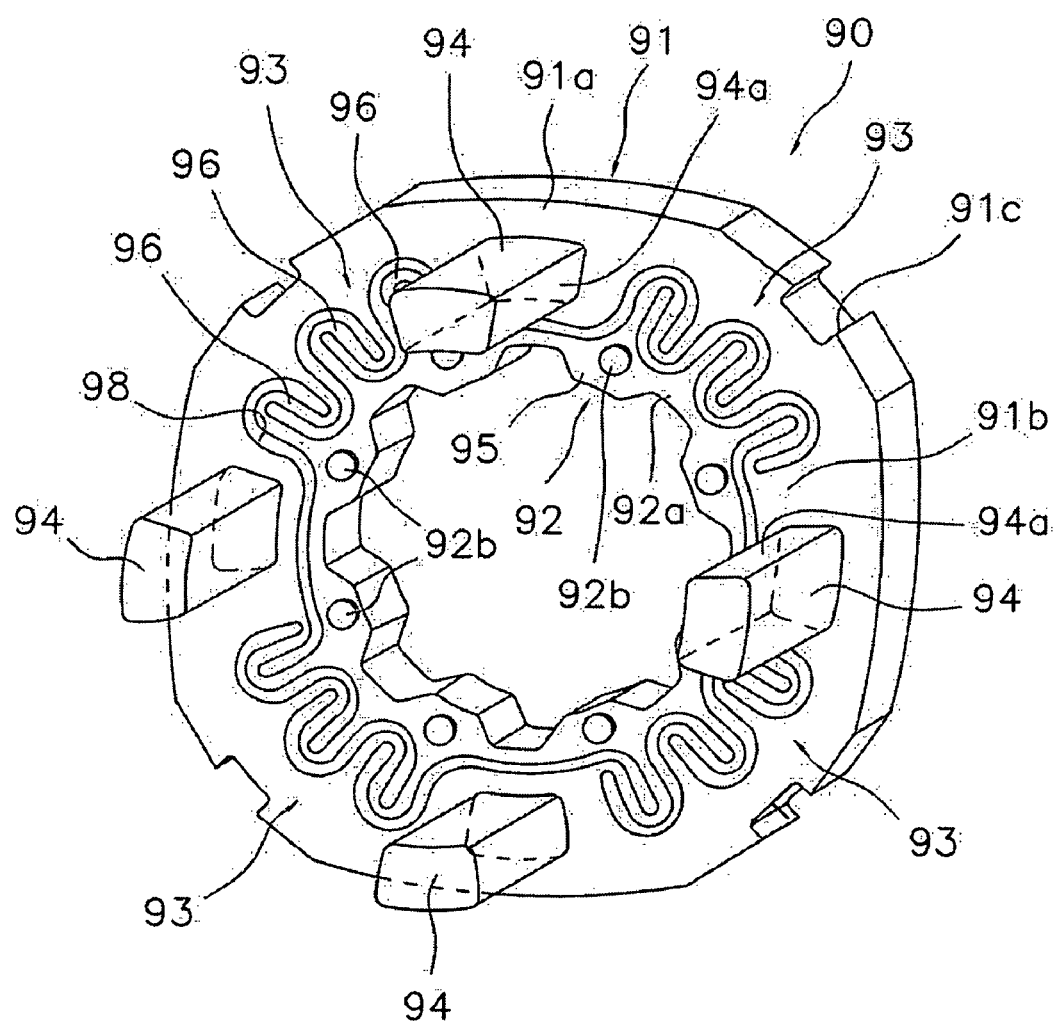
FIG. 10 is a simplified oblique view of a first bushing.
Figure 12:
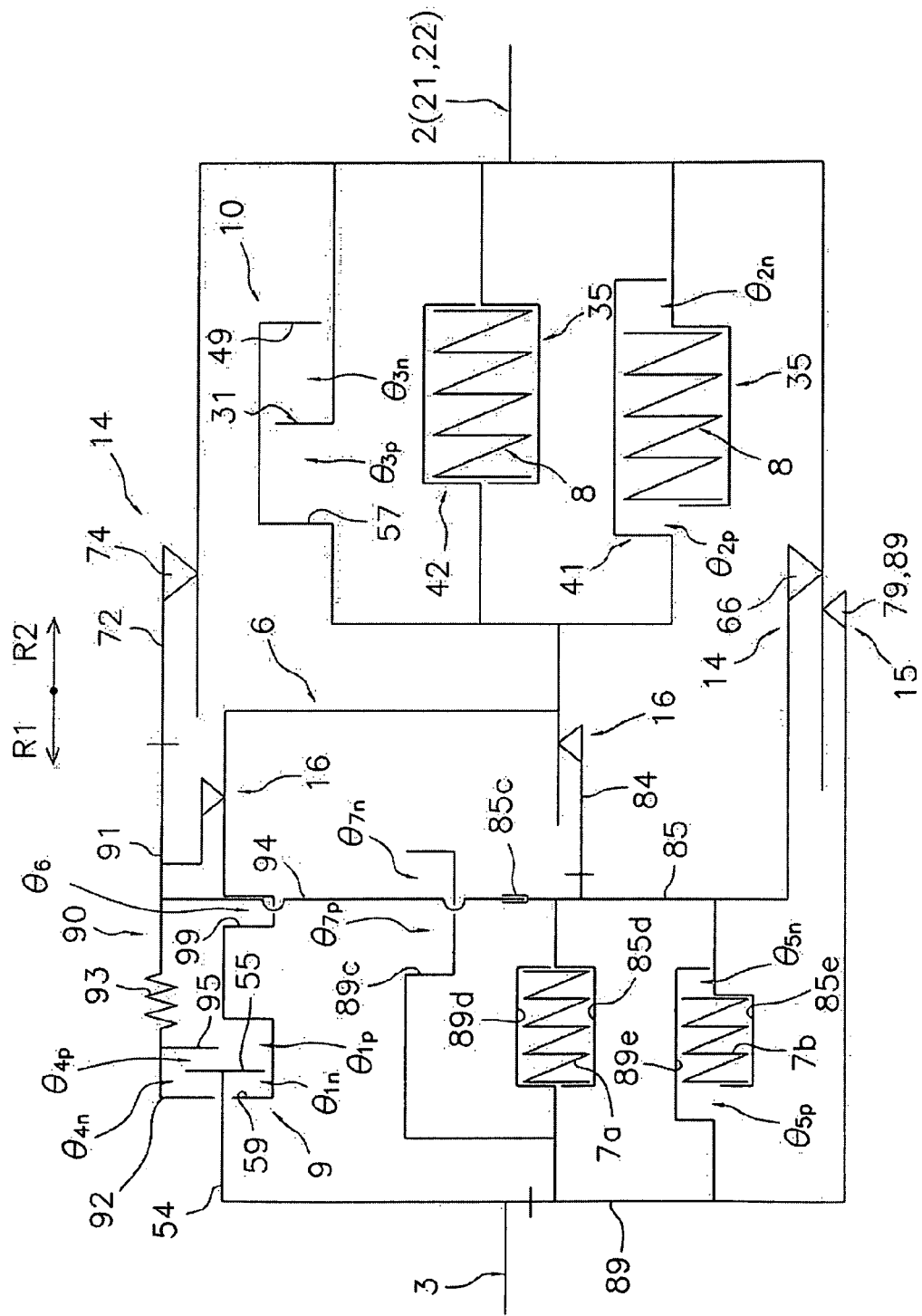
FIG. 12 is a mechanical circuit diagram of a damper mechanism (neutral state)

The damper mechanism 4 has the following configuration in order to obtain the above-mentioned torsional characteristics. The various members constituting the damper mechanism 4 will how be described in detail with reference to FIGS. 1 to 12. FIG. 3 is a simplified elevational view of the damper mechanism 4, FIG. 4 is an elevational view of a hub flange 6, FIG. 5 is an elevational view of an input rotary member 2, FIGS. 6 and 7 are partial cross sections of the damper mechanism 4, FIGS. 8 and 9 are partial cross sections of the damper mechanism 4, and FIG. 10 is a simplified oblique view of a first bushing 90. FIG. 6 is a simplified cross section taken along line A in FIG. 2, and FIG. 7 is a simplified cross section taken along line B in FIG. 2. FIG. 8 is a simplified elevational view of a cross section along line C in FIG. 7, and FIG. 9 is a simplified elevational view of a cross section along D in FIG. 7. FIG. 12 is a mechanical circuit diagram of the damper mechanism 4. The mechanical circuit diagram shown in FIG. 12 schematically illustrates the relationship of the various members of the damper mechanism in the rotational direction. Therefore, members that rotate integrally are treated as the same member. The left-right direction in FIG. 12 corresponds to the rotational direction.

As shown in FIG. 1, the damper mechanism 4 mainly has the input rotary member 2 serving as the first rotary member to which the clutch disk 23 is fixed, the hub flange 6 serving as the second rotary member and disposed rotatably with respect to the input rotary member 2, a spline hub 3 serving as the third rotary member and disposed rotatably with respect to the hub flange 6, first small coil springs 7a and second small coil springs 7b that elastically link the hub flange 6 and the spline hub 3 in the rotational direction, and large coil springs 8 serving as the elastic members that elastically link the input rotary member 2 and the hub flange 6 in the rotational direction. The spline hub 3 is spline-engaged with the end of an input shaft of a transmission (not shown).

As shown in FIG. 12, the first small coil springs 7a and the second small coil springs 7b are disposed in parallel, and the large coil springs 8 are disposed in parallel. The first small coil springs 7a and second small coil springs 7b and the large coil springs 8 are disposed in series via the hub flange 6 and its surrounding members. The first small coil springs 7a and second small coil springs 7b are less stiff than the large coil springs 8.

2.2: Input Rotary Member

As shown in FIG. 1 and FIGS. 5 to 7, the input rotary member 2 include a clutch plate 21 and a retaining plate 22. The clutch plate 21 and the retaining plate 22 are disk-shaped or annular members made of sheet metal, and are disposed spaced apart a specific distance in the axial direction. The clutch plate 21 is disposed on the engine side, while the retaining plate 22 is disposed on the transmission side. The clutch plate 21 and the retaining plate 22 are fixed to each other by linking components 31 (discussed below). Therefore, the clutch plate 21 and the retaining plate 22 are able to rotate integrally in a state in which the specific spacing is maintained in the axial direction. Also, the fixed components 24c of the clutch disk 23 are fixed by rivets 27 to the outer peripheral part of the clutch plate 21.

The function of the clutch plate 21 and the retaining plate 22 is to support the large coil springs 8. More specifically, the clutch plate 21 and the retaining plate 22 include a pair of annular first main body components 28, four support components 35 disposed aligned in the rotational direction around the outer peripheral part of the first main body components 28, and four linking components 31 disposed between the support components 35 in the rotational direction.

The support components 35 have flared components 35a and 35b on the inner peripheral side and outer peripheral side. The flared components 35a and 35b restrict movement of the large coil springs 8 in the axial direction and the radial direction. The length of the support components 35 in the rotational direction substantially coincides with the free length of the large coil springs 8. Contact faces 36 that come into contact, or nearly come into contact, with the end of the large coil springs 8 are formed at the ends of the support components 35 in the circumferential direction.

The linking components 31 are disposed on the outer peripheral side of the pair of first main body components 28, and link the pair of first main body components 28. More specifically, each of the linking components 31 has a contact component 32, which extends in the axial direction from the outer peripheral edge of one of the first main body components 28 (in this embodiment, the first main body component 28 of the retaining plate 22) to the other first main body component 28 (in this embodiment, the first main body component 28 of the clutch plate 21), and a fixed component 33 that extends inward in the radial direction from the end of the contact component 32 (see FIG. 7). The fixed components 33 are fixed to the fixed components 24c of the clutch disk 23 and by the rivets 27 to the first main body components 28 of the clutch plate 21.

The spline hub 3 is disposed in the center holes 37 and 38 of the clutch plate 21 and the retaining plate 22. The spline hub 3 has a cylindrical boss 52 extending in the axial direction, and a flange 54 extending outward in the radial direction from the boss 52. A spline hole 53 that engages with the input shaft of the transmission (not shown) is formed in the inner peripheral part of the boss 52.

2.2.2: Hub Flange

As shown in FIG. 12, the hub flange 6 is elastically linked in the rotational direction with respect to the input rotary member 2. More specifically, as shown in FIGS. 1 to 7, the hub flange 6 is disposed relatively rotatably in the axial direction between the clutch plate 21 and the retaining plate 22, and is elastically linked in the rotational direction to the clutch plate 21 and the retaining plate 22 by the large coil springs 8. The hub flange 6 has an annular second main body component 29, a pair of first windows 41 and a pair of second windows 42 formed at the outer peripheral part of the second main body component 29, and four cut-outs 43 formed at the outer peripheral part of the second main body component 29. The pair of first windows 41 and the pair of second windows 42 are disposed at locations corresponding to the four support components 35. The first windows 41 are disposed opposite one another in the radial direction, and the second windows 42 are disposed opposite one another in the radial direction.

As shown in FIGS. 3 and 12, the large coil springs 8 are housed in the first windows 41 and the second windows 42. The length of the first windows 41 in the rotational direction is set longer than the free length of the large coil springs 8 (the length of the support components 35 in the rotational direction), and the length of the second windows 42 in the rotational direction is set to be substantially the same as the free length of the large coil springs 8 (the length of the support components 35). First contact faces 44 and second contact faces 47 that come into contact, or nearly come into contact, with the end faces of the large coil springs 8 are formed at both ends of the first windows 41 and the second windows 42 in the circumferential direction. In a neutral state, the gap angle $\theta 2p$ is maintained between the first contact faces 44 and the ends of the large coil springs 8 on the R1 side. The gap angle $\theta 2n$ is maintained between the first contact faces 44 and the ends of the large coil springs 8 on the R2 side. These configurations afford regions in which two large coil springs 8 are compressed in parallel (the third stage region on the positive side and the second stage region on the negative side) and regions in which four large coil springs 8 are compressed in parallel (the fourth stage region on the positive side and the third stage region on the negative side) (FIG. 11). Also, in a neutral state in which no torque is inputted, the relative positions of the input rotary member 2 and the hub flange 6 in the rotational direction are determined by the two large coil springs 8 held in the second windows 42.

2.2.3: Spline Hub

As shown in FIG. 12, the spline hub 3 is elastically linked to the hub flange 6 in the rotational direction. More specifically, as shown in FIGS. 1 to 7, a plurality of outer peripheral teeth 55 is formed around the outer peripheral part of a flange 54 of the spline hub 3. A plurality of inner peripheral teeth 59 are formed as the first inner peripheral teeth around the inner peripheral part of the hub flange 6. The outer peripheral teeth 55 and inner peripheral teeth 59 mesh with a specific gap in between. In a neutral state in which no torque is inputted, a gap is formed in the rotational direction between the outer peripheral teeth 55 and the inner peripheral teeth 59. The torsional angle corresponding to the gap formed on the R1 side of the inner peripheral teeth 59 is the gap angle $\theta 1p$. The torsional angle corresponding to the gap formed on the R2 side of the inner peripheral teeth 59 is the gap angle $\theta 1n$.

2.2.4: Coil Springs

As shown in FIGS. 1 and 6, each of the large coil springs 8 includes a pair of coil springs of different diameters disposed concentrically. The large coil springs 8 are longer and larger in diameter than the first small springs 7a and second small coil springs 7b. The spring constant of the large coil springs 8 is set to a value that is much higher than the spring constant of the first small coil springs 7a and second small coil springs 7b. Specifically, the large coil springs 8 are much stiffer than the first small coil springs 7a and second small coil springs 7b. Accordingly, when torque is inputted to the input rotary member 2, the first small coil springs 7a and second small coil springs 7b begin to compress between the hub flange 6 and the spline hub 3, and when the hub flange 6 and the spline hub 3 rotate integrally, the large coil springs 8 begin to compress between the input rotary member 2 and the hub flange 6.

2.2.5: Stopper Mechanisms

The damper mechanism 4 is provided with a first stopper 9 and a second stopper 10 for directly transmitting torque that has been inputted to the input rotary member 2.

As shown in FIG. 9, the first stopper 9 is a mechanism for limiting relative movement between the hub flange 6 and the spline hub 3 to a specific range, and includes the outer peripheral teeth 55 of the spline hub 3 and the inner peripheral teeth 59 of the hub flange 6. The first stopper 9 permits relative rotation between the hub flange 6 and the spline hub 3 within a range of the gap angles $\theta 1p$ and $\theta 1n$. As shown in FIG. 11, the range of low torsional stiffness is determined by the gap angles $\theta 1p$ and $\theta 1n$.

As shown in FIG. 3, the second stopper 10 is a mechanism for limiting relative movement between the hub flange 6 and the spline hub 3 to a specific range, and includes the linking components 31 of the input rotary member 2 and the first protrusions 49 and second protrusions 57 of the hub flange 6.

More specifically, a pair of first protrusions 49 and a pair of second protrusions 57 extending outward in the radial direction are formed around the outer peripheral edge of the second main body component 29. The first protrusions 49 and the second protrusions 57 are disposed on the outer peripheral side of the first windows 41 and the second windows 42, and stopper faces 50 and 51 are formed at the ends in the rotational direction. The stopper faces 50 and 51 are able to come into contact with stopper faces 39 of the linking components 31.

In the neutral state shown in FIG. 3, a gap is ensured in the rotational direction between the linking components 31 and the first protrusions 49 and second protrusions 57. The torsional angles corresponding to this gap (first angles) are the gap angles $\theta 3p$ and $\theta 3n$. The gap formed on the R1 side of the linking components 31 corresponds to the gap angle $\theta 3p$, while the gap formed on the R2 side of the linking components 31 corresponds to the gap angle $\theta 3n$. Consequently, the second stopper 10 permits relative rotation of the input rotary member 2 and the spline hub 3 within the range of the gap angles $\theta 3p$ and $\theta 3n$. As shown in FIG. 11, the range of low torsional stiffness is determined by the gap angles $\theta 3p$ and $\theta 3n$.

2.2.6: Friction Generating Mechanism

The most salient feature of the damper mechanism 4 lies in the configuration of the friction generating mechanism 5. The friction generating mechanism 5 for utilizing frictional resistance to generate hysteresis torque is provided to the damper mechanism 4 in order to absorb and damp torsional vibration more effectively. More specifically, as shown in FIGS. 6 and 7, the friction generating mechanism 5 includes a first friction washer 79, a second friction washer 72, a third friction washer 84, a fourth friction washer 85, a first bushing 90, and a second bushing 89. The second friction washer 72 and the first bushing 90 constitute the above-mentioned friction member.

The hysteresis torque shown in FIG. 11 is attained by the friction generating mechanism 5. More specifically, the first low hysteresis torque Th1 shown in FIG. 11 is generated by the first friction washer 79 and the fourth friction washer 85. The high hysteresis torque Th2 is generated by the first friction washer 79, the second bushing 89, the second friction washer 72, and the fourth friction washer 85. The second low hysteresis torque Th3 is generated by the third friction washer 84 and the first bushing 90.

The first low hysteresis torque Th1 is generated in the entire region of torsional characteristics. The high hysteresis torque Th2 is generated in the third and fourth stage regions on the positive side of the torsional characteristics, and in the second and third stage regions on the negative side of the torsional characteristics. The high hysteresis torque Th2 includes the first low hysteresis torque Th1. The second low hysteresis torque Th3 is generated only when the generation of high hysteresis torque is prevented by a rotational direction gap. The second low hysteresis torque Th3 includes the first low hysteresis torque Th1.

To attain these hysteresis torque characteristics, the various members of the friction generating mechanism 5 have the following configuration. More specifically, as shown in FIGS. 6 and 7, the first friction washer 79 and the second friction washer 72 are disposed between the hub flange 6 and the retaining plate 22 in the axial direction. The third friction washer 84, the fourth friction washer 85, and the second bushing 89 are disposed between the hub flange 6 and the clutch plate 21 in the axial direction. The second friction washer 72 and the fourth friction washer 85 are linked by the first bushing 90 so as to be capable of integral rotation. The fourth friction washer 85 and the second bushing 89 are elastically linked in the rotational direction by the first small coil springs 7a and second small coil springs 7b. The second bushing 89 is linked to the spline hub 3 so as to be capable of integral rotation. Accordingly, the second friction washer 72, the first bushing 90, and the fourth friction washer 85 are elastically linked in the rotational direction via the second bushing 89, the first small coil springs 7a, and the second small coil springs 7b.

The first friction washer 79 is disposed between the flange 54 of the spline hub 3 and the inner peripheral part of the retaining plate 22 in the axial direction, and is disposed on the outer peripheral side of a boss 52. The first friction washer 79 is made of plastic, for example. A first cone spring 80 is disposed between the first friction washer 79 and the flange 54. The first cone spring 80 is compressed in the axial direction between the first friction washer 79 and the retaining plate 22. Accordingly, the first friction washer 79 is pressed against the retaining plate 22 by the first cone spring 80.

The second friction washer 72 is disposed between the inner peripheral part of the hub flange 6 and the inner peripheral part of the retaining plate 22, and is disposed on the outer peripheral side of the first friction washer 79. More specifically, the second friction washer 72 primarily includes an annular washer main body 72a, four engagement components 72b that extend in the axial direction from the outer peripheral edge of the washer main body 72a, and a friction member 74 that is fixed to the washer main body 72a. A second cone spring 81 is disposed in a state of being compressed in the axial direction between the second friction washer 72 and the first bushing 90. Accordingly, the friction face of the friction member 74 of the second friction washer 72 is pressed against the retaining plate 22 by the second cone spring 81. The second friction washer 72 is engaged in the rotational direction with the first bushing 90 by the engagement components 72b. Consequently, the second friction washer 72 and the first bushing 90 are able to rotate integrally.

As shown in FIGS. 6 and 10, the first bushing 90 is disposed between the second friction washer 72 and the hub flange 6 (more specifically, between the second cone spring 81 and die hub flange 6). The first bushing 90 mainly comprises a first annular component 91, a second annular component 92, and four linking components 93 that elastically link the first annular component 91 and the second annular component 92 in the rotational direction. The first bushing 90 is an integrally molded plastic member, for example.

The first annular component 91 and the second annular component 92 are annular plate-shaped members, and the first annular component 91 is disposed on the outer peripheral side of the second annular component 92. As shown in FIGS. 6 and 7, the first annular component 91 is biased to the engine side by the second cone spring 81.

The first annular component 91 has an annular main body component 91a, four extensions 91b that extend inward in the radial direction from the main body component 91a, protrusions 94 that extend in the axial direction from the extensions 91b, and concave components 91c formed on the outer peripheral side of the main body component 91a. Linking components 93 are disposed between adjacent extensions 91b. The concave components 91c are disposed on the outer peripheral side of the linking components 93. The concave components 91c are recessed in the radial direction. The four engagement components 72b of the washer main body 72a are inserted in the axial direction in the concave components 91c. Consequently, the first annular component 91 and the second friction washer 72 are capable of relative rotation and are capable of relative movement in the axial direction.

The second annular component 92 has an annular main body 92a and a plurality of inner peripheral teeth 95 serving as the second inner peripheral teeth and extending inward in the radial direction from the main body 92a. The inner peripheral teeth 95 mesh with the outer peripheral teeth 55 of the spline hub 3 (discussed below), with a gap in between. The gap on the R2 side of the inner peripheral teeth 95 corresponds to the gap angle θ4n. The second annular component 92 also has a plurality of sliding components 92b that come into contact with the hub flange 6. The sliding components 92b extend in the axial direction, and come into contact with the face of the hub flange 6 on the transmission side. Accordingly, the first annular component 91 and the main body 92a do not come into contact with the hub flange 6.

The linking components 93 have three deformation components 96 that extend from the inner peripheral part of the first annular component 91 (more specifically, the inner peripheral part of the main body component 91a) to the outer peripheral part of the second annular component 92. The deformation components 96 are bent in a wave shape (S shape). One end of the deformation components 96 is integrally linked to the inner peripheral part of the main body component 91a and the portion of the extensions 91b on the R1 side, and the other end of the deformation components 96 is integrally linked to the outer peripheral part of the main body 92a. More specifically, one end of the deformation components 96 is a portion extending inward in the radial direction from the inner peripheral part of the first annular component 91, and the other end of the deformation components 96 is a portion extending outward in the radial direction from the outer peripheral part of the second annular component 92. The two ends of the deformation components 96 are linked by two semicircular parts. Thus, the deformation components 96 are capable of overall elastic deformation in the rotational direction.

The configuration of the linking components 93 will be described from another standpoint. The first annular component 91, the second annular component 92, and the linking components 93 can be considered to be formed by forming a plurality of slits 98 by punching, etc., in a single annular plate-shaped member. The slits 98 are bent in a rough wave shape (S shape), and the slits 98 are put together in a complementary fashion. The width of the slits 98 is determined on the basis of the relative torsional angle needed for the first annular component 91 and the first annular component 91. More specifically, the width is determined so that the first annular component 91 and the second annular component 92 will be capable of relative rotation of at least an angle θ1p to θ4p.

With the above configuration, the first annular component 91 and the second annular component 92 are elastically linked in the rotational direction by the linking components 93. Accordingly, when the first annular component 91 and the second annular component 92 rotate relatively, the deformation components 96 of the linking components 93 undergo elastic deformation. As a result, a force in the rotational direction that attempts to put the first annular component 91 and the second annular component 92 in a neutral state is generated between the first annular component 91 and the second annular component 92.

The protrusions 94 are disposed near the center of the extensions 91b in the circumferential direction. The protrusions 94 extend in the rotational direction from the extensions 91b to the clutch plate 21 side. A cross section of the protrusions 94 is substantially fan shaped. More specifically, the inner and outer faces in the radial direction are arc-shaped, while the contact faces 94a on the R1 and R2 sides in the rotational direction are flat. The contact faces 94a are formed in the radial direction, and are substantially perpendicular to the rotational direction. The protrusions 94 are inserted into holes 99 formed in the hub flange 6. A gap is maintained between the contact faces 94a of the protrusions 94 and the contact faces 99a of the holes 99. The torsional angle (second angle) corresponding to this gap is the gap angle θ6. Accordingly, the first annular component 91 is capable of relative rotation within a range of the gap angle θ6 in the rotational direction with respect to the hub flange 6. This gap angle θ6 corresponds to the above-mentioned rotational direction gap (the gap for preventing the generation of high hysteresis torque).

The inner peripheral teeth 95 mesh with the outer peripheral teeth 55 via a gap. In a neutral state, when the protrusions 94 are in contact with the holes 99 on the R1 side in the rotational direction, a gap is maintained between the inner peripheral teeth 95 and the outer peripheral teeth 55 in the rotational direction. The torsional angle corresponding to the gap on the R1 side of the inner peripheral teeth 95 is the gap angle θ4p. The torsional angle corresponding to the gap on the R2 side of the inner peripheral teeth 95 is the gap angle θ4n. The gap angle θ4n is substantially the same size as the gap angle θ1n, but the gap angle θ4p is smaller than the gap angle θ1n. Accordingly, when the hub flange 6 and the first bushing 90 rotate relatively to the R1 side with respect to the spline hub 3, first the outer peripheral teeth 55 hit the inner peripheral teeth 95, and when relative rotation proceeds further, the outer peripheral teeth 55 hit the inner peripheral teeth 59 while in contact with the inner peripheral teeth 95. Since the second annular component 92 is pressed by the outer peripheral teeth 55 at this point, the second annular component 92 rotate relatively to the R2 side with respect to the hub flange 6. Meanwhile, the protrusions 94 restrict the relative rotation of the first annular component 91 to the R2 side with respect to the hub flange 6. Accordingly, in a state in which the outer peripheral teeth 55 are in contact with the inner peripheral teeth 95 and the inner peripheral teeth 59, the linking components 93 are elastically deformed between the first annular component 91 and the second annular component 92. The elastic force of the linking components 93 presses the protrusions 94 of the first annular component 91 against the contact faces 99a on the R2 side of the holes 99. In this state, the first annular component 91 and the hub flange 6 function as an integral member.

The fourth friction washer 85 is an annular member disposed between the hub flange 6 and the clutch plate 21. More specifically, as shown in FIGS. 6 and 7, the fourth friction washer 85 mainly has a main body 85a, an outer peripheral part 85b, and a friction member 66 fixed to the main body 85a. Four concave components 85c are formed in the main body 85a. The concave components 85c are recessed in the axial direction, and their shape is substantially the same as a cross section of the protrusions 94. The protrusions 94 of the first bushing 90 are fitted into the concave components 85c in a state of having substantially no gap in the rotational direction or the radial direction. Accordingly, the first bushing 90 and the fourth friction washer 85 rotate integrally. Also, the end faces 94b of the protrusions 94 come into contact in the rotational direction with the bottom faces of the concave components 85c (the faces oriented in the axial direction). Accordingly, the fourth friction washer 85 is pressed against the clutch plate 21 by the second cone spring 81 via the first bushing 90.

The annular outer peripheral part 85b that sticks out on the hub flange 6 side is formed on the outer peripheral side of the main body 85a. The third friction washer 84 is disposed between the main body 85a and the hub flange 6. A third cone spring 82 is disposed between the third friction washer 84 and the outer peripheral part 85b in a state of being compressed in the axial direction. Accordingly, the third friction washer 84 is pressed against the hub flange 6 by the third cone spring 82.

The second bushing 89 is an annular member disposed between the fourth friction washer 85 and the hub flange 6. More specifically, the second bushing 89 includes a sliding component 89a and an engagement component 89b disposed on the outer peripheral side of the sliding component. The sliding component 89a is an annular member that is disposed between the flange 54 and the inner peripheral edge of the clutch plate 21, and is capable of sliding with the inner peripheral part of the clutch plate 21. A plurality of inner peripheral teeth 89f extending inward in the radial direction is formed on the inner peripheral part of the engagement component 89b. The inner peripheral teeth 89f mesh with the outer peripheral teeth 55 in a state in which there is substantially no gap. Consequently, the spline hub 3 and the second bushing 89 rotate integrally.

Four first cut-outs 89c, two second cut-outs 89d, and two third cut-outs 89e are formed in the outer peripheral part of the engagement component 89b. The first cut-outs 89c are disposed at positions corresponding to the protrusions 94. The length of the first cut-outs 89c in the rotational direction is greater than the length of the protrusions 94 in the rotational direction. In a neutral state, a gap is formed between the protrusions 94 and the first cut-outs 89c. The torsional angle corresponding to the R1 side of the protrusions 94 is the gap angle $\theta 7p$. The torsional angle corresponding to the R2 side of the protrusions 94 is the gap angle $\theta 7n$. The second cut-outs 89d are disposed at positions corresponding to the radial direction, flanking the rotational axis O. The third cut-outs 89e are disposed at positions corresponding to the radial direction, flanking the rotational axis O. The first cut-outs 89c are disposed between the second cut-outs 89d and the third cut-outs 89e in the radial direction.

Two first holders 85d and two second holders 85e are formed in the fourth friction washer 85. The first holders 85d and the second holders 85e are recessed in the axial direction. The positions of the first holders 85d and the second holders 85e in the radial direction substantially coincide with the concave components 85c. The first holders 85d are formed at positions corresponding to the second cut-outs 89d in the second bushing 89, and the second holders 85e are formed at positions corresponding to the third cut-outs 89e.

The above-mentioned first small coil springs 7a are held in the first holders 85d and the second cut-outs 89d. The above-mentioned second small coil springs 7b are held in the second holders 85e and the third cut-outs 89e. The length of the first holders 85d and the second cut-outs 89d in the rotational direction is substantially the same as the natural length of the first small coil springs 7a. The length of the third cut-outs 89e in the rotational direction may be greater than the length of the second small coil springs 7b. A gap is maintained between the ends of the second small coil springs 7b and the edges of the third cut-outs 89e in the rotational direction. The torsional angle corresponding to the gap on the R1 side of the second small coil springs 7b is the gap angle $\theta 5p$, and the torsional angle corresponding to the gap on the R2 side of the second small coil springs 7b is the gap angle $\theta 5n$.

The above configuration affords regions in which the two first small coil springs 7a are compressed in parallel (the first stage region on the positive side, and the first stage region on the negative side), and a region in which the two first small coil springs 7a and the two small coil springs 7b are compressed in parallel (the second stage region on the positive side) (FIG. 11). In a neutral state in which no torque is inputted, the relative positions of the fourth friction washer 85 and the second bushing 89 in the rotational direction are determined by the second small coil springs 7b held in the first holders 85d and the second cut-outs 89d.

The biasing force generated by the third cone spring 82 is less than the biasing force generated by the first cone spring 80 and the third cone spring 82. Also, the coefficient of friction between the first friction washer 79 and the retaining plate 22 is lower than the coefficient of friction between the friction member 74 and the retaining plate 22. Accordingly, the hysteresis torque generated by the first friction washer 79 is much lower than the hysteresis torque generated by the second friction washer 72. Also, the coefficient of friction between the third friction washer 84 and the hub flange 6, and the coefficient of friction between the second bushing 89 and the clutch plate 21 are both lower than the coefficient of friction between the fourth friction washer 85 and the clutch plate 21. Accordingly, the hysteresis torque generated by the third friction washer 84 and the second bushing 89 is much lower than the coefficient of friction generated by the fourth friction washer 85.

As discussed above, a large friction generating mechanism 14 is constituted by the second friction washer 72 and the fourth friction washer 85, a first small friction generating mechanism 15 is constituted by the first friction washer 79 and the second bushing 89, and a second small friction generating mechanism 16 is constituted by the first bushing 90 and the third friction washer 84. When the input rotary member 2, the hub flange 6, and the spline hub 3 rotate relatively, the large friction generating mechanism 14, the first small friction generating mechanism 15, and the second small friction generating mechanism 16 generate hysteresis torque, and torsional vibration can be more effectively damped and absorbed by the damper mechanism 4.

The structure described above can also be such that a first damper, having the first small coil springs 7a, the second small coil springs 7b, and the first stopper 9, and a second damper, having the large coil springs 8 and the second stopper 10, are disposed in series.

4. Operation

Figure 17:
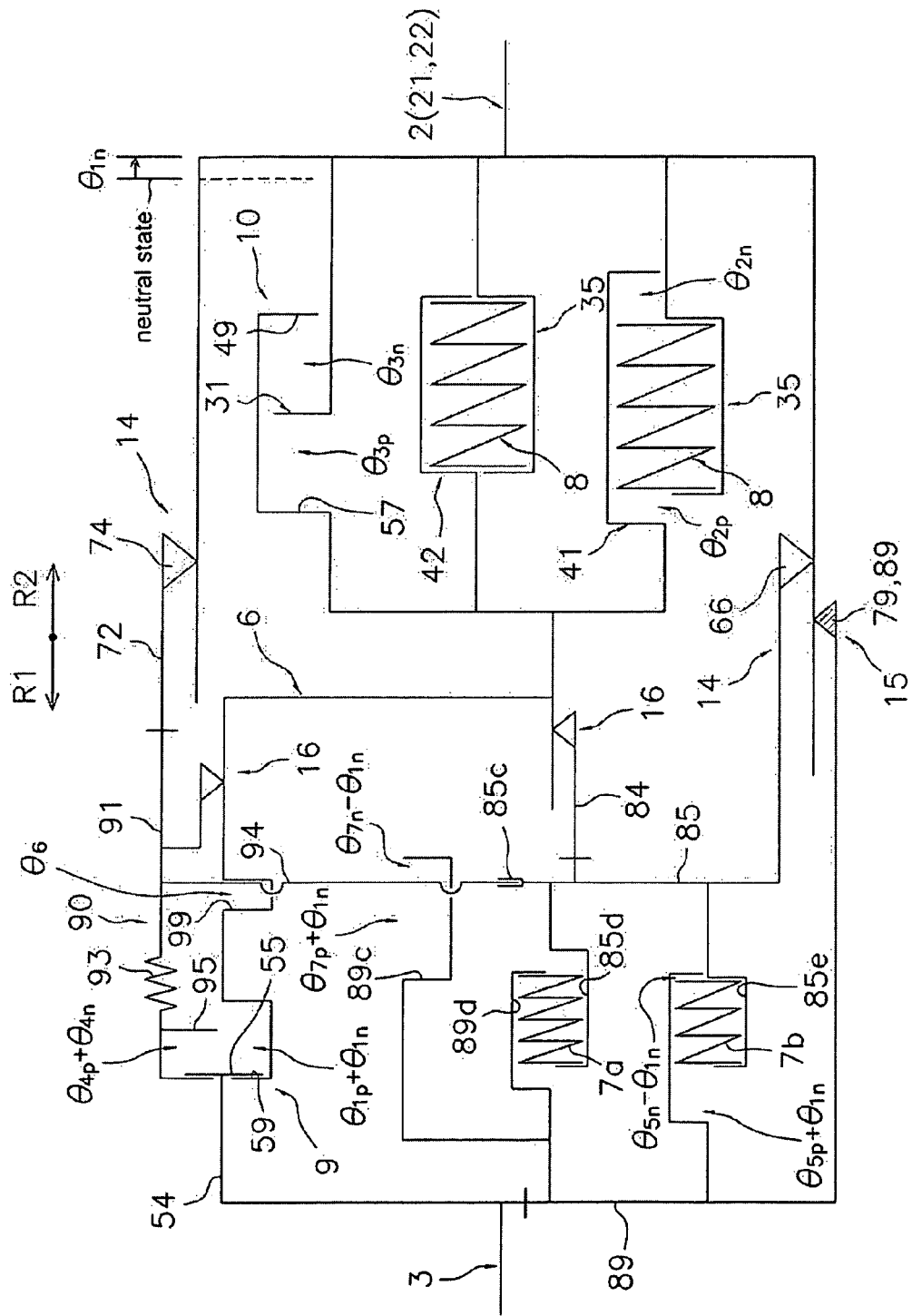
FIG. 17 is a mechanical circuit diagram of a damper mechanism in which the inner peripheral teeth hitting outer peripheral teeth, and a first stopper coming into play.
Figure 18:
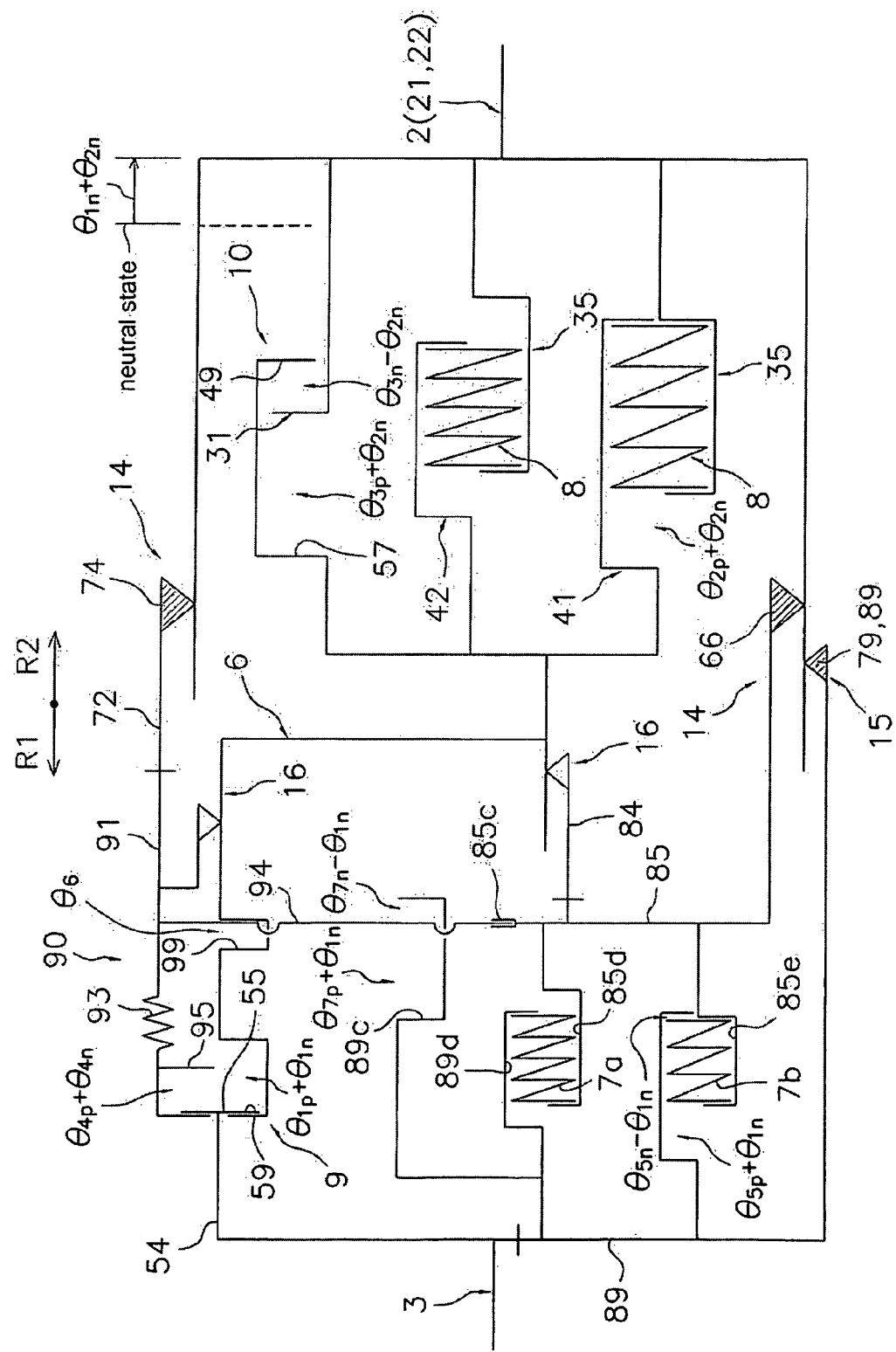
FIG. 18 is a mechanical circuit diagram of a damper mechanism which shows two large coil springs being compressed.
Figure 19:
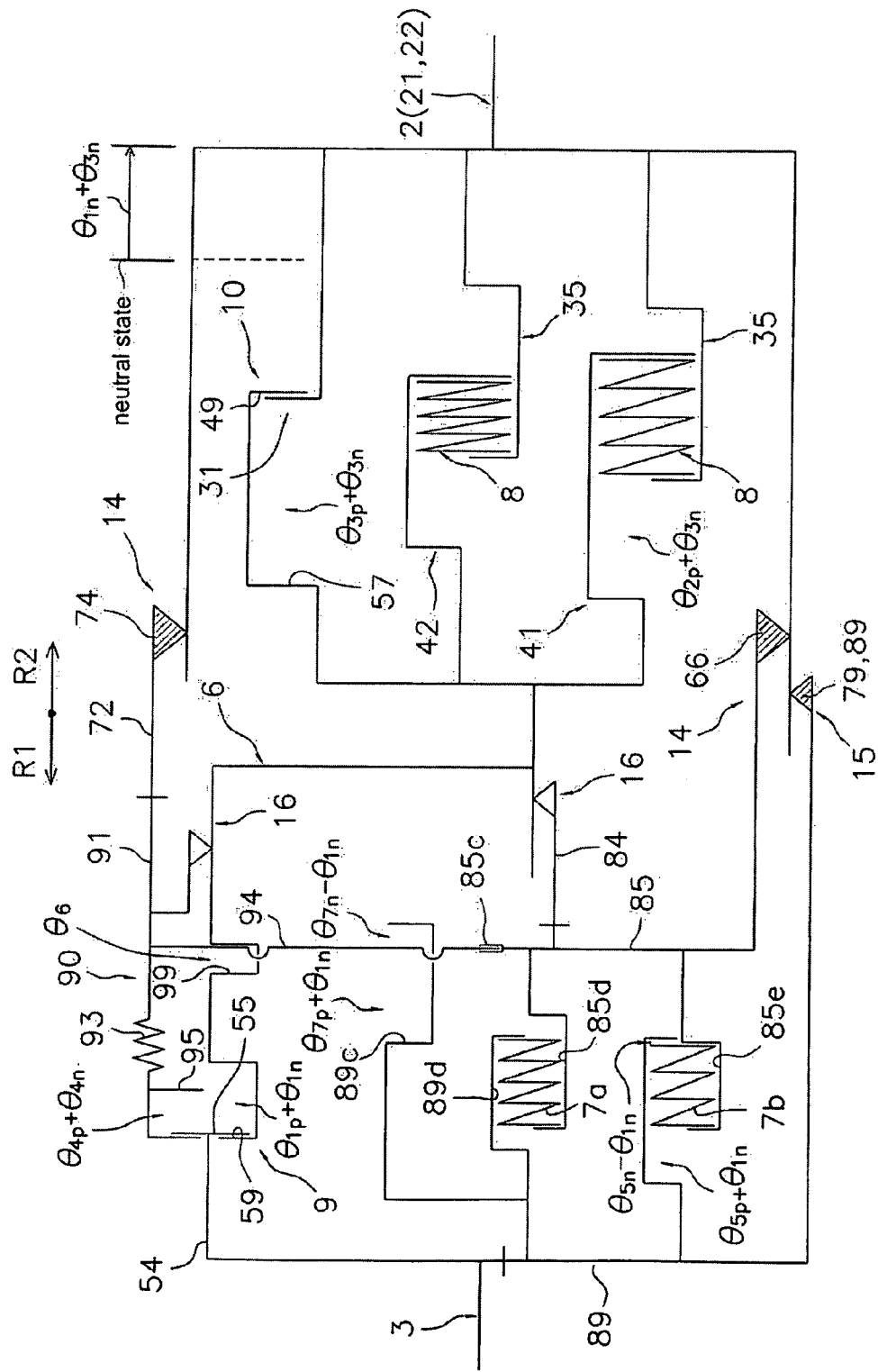
FIG. 19 is a mechanical circuit diagram of a damper mechanism.

Next, the torsional characteristics and the operation of the damper mechanism of the clutch disk assembly 1 will be described through reference to FIGS. 12 to 19. FIG. 12 is a mechanical circuit diagram of neutral state (a state in which no torque is inputted). FIGS. 13 to 16 are mechanical circuit diagrams showing operation on the positive side of the torsional characteristics. FIGS. 17 to 19 are mechanical circuit diagrams showing operation on the negative side of the torsional characteristics.

4.1: Positive Side of Torsional Characteristics 4.1.1: First and Second Stage Regions On the positive side of the torsional characteristics, the input rotary member 2 is twisted from the neutral state in FIG. 12 to the R1 side (drive side) with respect to the spline hub 3. At this point the stiffness of the first small coil springs 7a is much lower than the stiffness of the large coil springs 8, so the large coil springs 8 are hardly compressed at all, and the input rotary member 2 and the hub flange 6 rotate integrally. At this point the protrusions 94 of the first bushing 90 are pressed to the R1 side by the edges of the holes 99 in the hub flange 6. Accordingly, the first bushing 90, the second friction washer 72, and the fourth friction washer 85 also rotate integrally along with the input rotary member 2 and the hub flange 6. As a result, the first small coil springs 7a are compressed between the hub flange 6 and the spline hub 3 (more specifically, between the fourth friction washer 85 and the second bushing 89).

Figure 13:
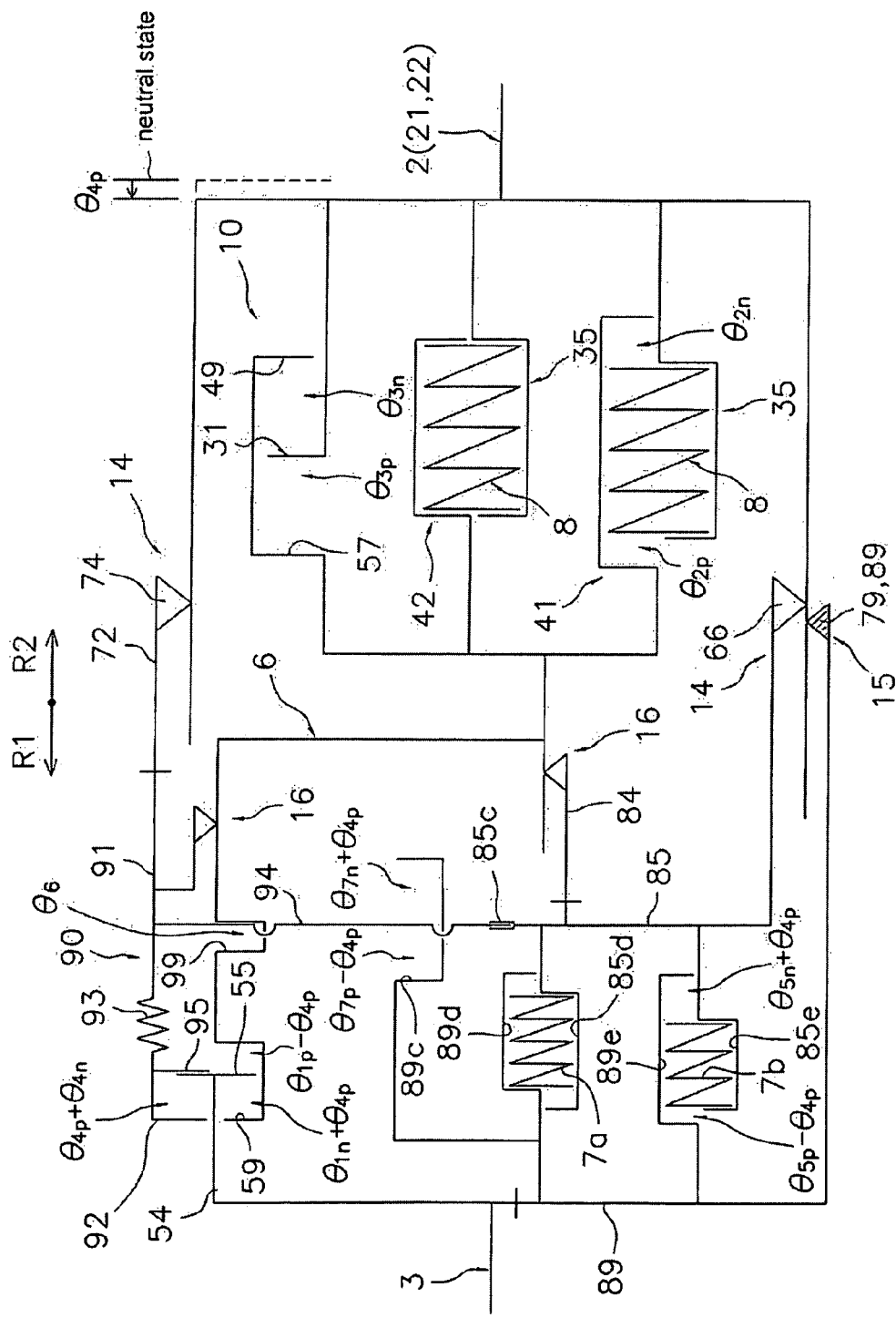
FIG. 13 is a mechanical circuit diagram of a damper mechanism which shows inner peripheral teeth.

When the input rotary member 2 rotates relatively to the R1 side with respect to the spline hub 3 by the torsional angle $\theta 4p$, the inner peripheral teeth 95 of the first bushing 90 come into contact with the outer peripheral teeth 55 of the spline hub 3 (FIG. 13). As the relative rotation of the input rotary member 2 with respect to the spline hub 3 progresses, the inner peripheral teeth 95 are pushed by the outer peripheral teeth 55, and the linking components 93 undergo elastic deformation in the rotational direction. Also, in addition to the first small coil springs 7a, compression of the second small coil springs 7b commences between the fourth friction washer 85 and the second bushing 89.

When the torsional angle of the input rotary member 2 with respect to the spline hub 3 reaches the angle $\theta 1p$, the outer peripheral teeth 55 hit the inner peripheral teeth 59 and the first stopper 9 comes into play. As a result, the relative rotation of the hub flange 6 and the spline hub 3 stops. Accordingly, the compression of the first small coil springs 7a and the second small coil springs 7b also stops (FIG. 14).

Also, when the input rotary member 2 rotates with respect to the spline hub 3, the first low hysteresis torque Th1 is generated in the first small friction generating mechanism 15.

The result of the above operation is that the torsional characteristics of the first and second stage regions of low hysteresis torque and low-torsional stiffness are realized (FIG. 11).

Figure 14:
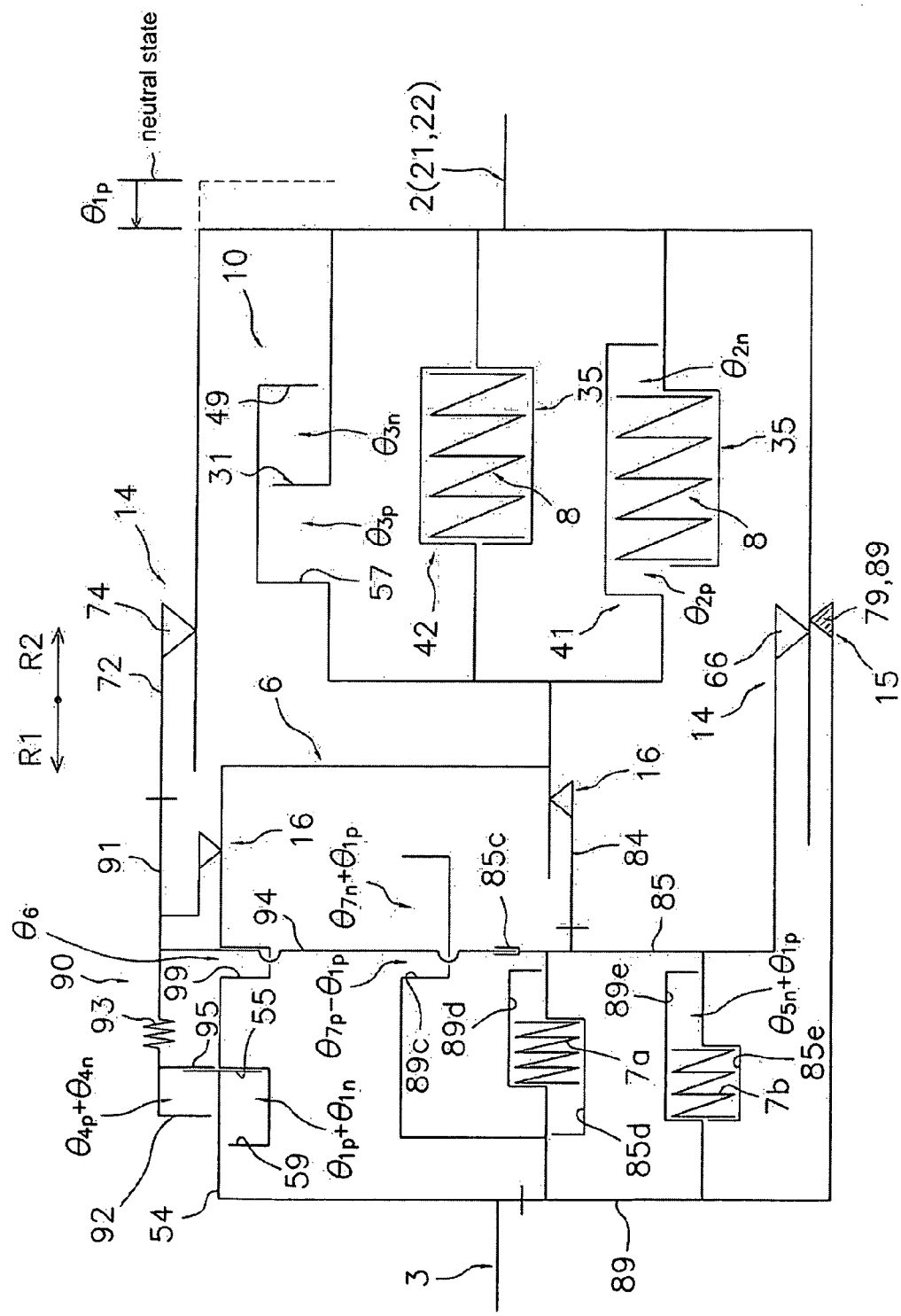
FIG. 14 is a mechanical circuit diagram of a damper mechanism which shows compression of first small coil springs and the second small coil springs stopping.

When the outer peripheral teeth 55 hit the inner peripheral teeth 59, the elastic deformation of the linking components 93 stops (FIG. 14). In this state, a biasing force in the rotational direction is exerted by the linking components 93 between the first annular component 91 and the second annular component 92. Accordingly, the protrusions 94 are pressed to the R2 side of the holes 99, and the inner peripheral teeth 95 are pressed to the R1 side of the outer peripheral teeth 55. Consequently, the first bushing 90 can function as an integral member with the hub flange 6 and the spline hub 3.

4.1.2: Third and Fourth Stage Regions

When the input rotary member 2 rotates further to the R1 side from the state in FIG. 14, the input rotary member 2 rotates relatively with respect to the hub flange 6, and compression commences of the two large coil springs 8 held in the second windows 42 between the input rotary member 2 and the hub flange 6. The two large coil springs 8 are compressed in parallel until the torsional angle is an angle of $\theta 1p+\theta 2p$.

Figure 15:
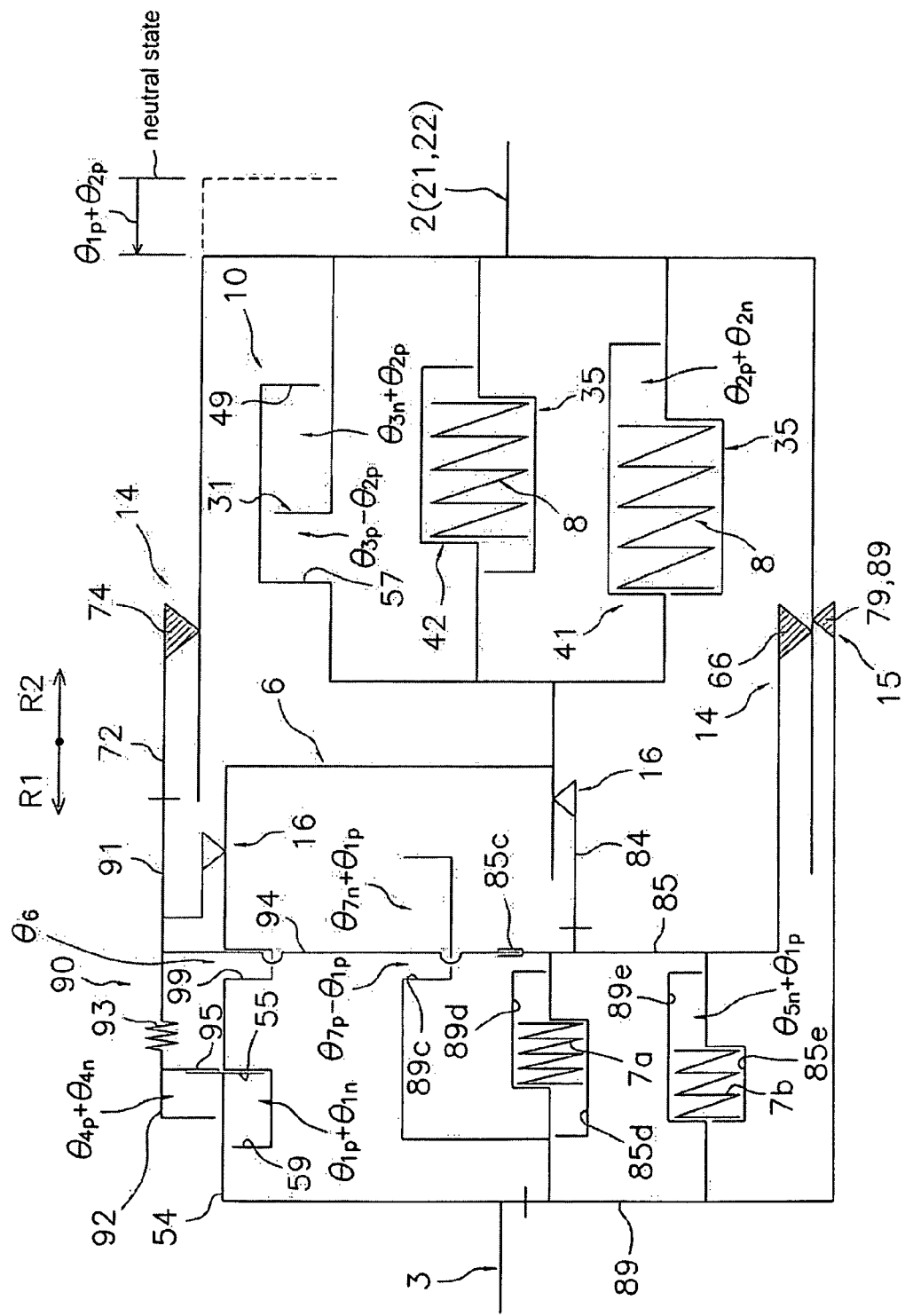
FIG. 15 is a mechanical circuit diagram of a damper mechanism which shows four large coil springs 8 beginning to be compressed.

As the relative rotation of the input rotary member 2 with respect to the spline hub 3 progresses, the four large coil springs 8 begin to be compressed (FIG. 15). When the torsional angle reaches an angle of $\theta 1p+\theta 3p$, the second stopper 10 comes into play, and the relative rotation of the input rotary member 2 and the spline hub 3 stops.

Also, when the input rotary member 2 and the hub flange 6 rotate relatively, high hysteresis torque is generated not only by the first small friction generating mechanism 15, but also by the large friction generating mechanism 14 (the second friction washer 72 and the fourth friction washer 85).

The result of the above operation is that the torsional characteristics of the third and fourth stage regions of high hysteresis torque and high torsional stiffness are realized (FIG. 11).

4.2: Negative Side of Torsional Characteristics 4.2.1: First Stage Region

On the negative side of the torsional characteristics, the input rotary member 2 is twisted from the neutral state in FIG. 12 to the R2 side (the non-drive side) with respect to the spline hub 3. At this point the stiffness of the first small coil springs 7a is much lower than the stiffness of the large coil springs 8, so the large coil springs 8 are hardly compressed at all, and the input rotary member 2 and the hub flange 6 rotate integrally. The coefficient of friction between the second friction washer 72 and the retaining plate 22, and the coefficient of friction between the fourth friction washer 85 and the clutch plate 21 are both large. As a result, the hysteresis torque generated by the large friction generating mechanism 14 is much higher than the torque required to compress the first small coil springs 7a. Therefore, the fourth friction washer 85 rotates relatively with the input rotary member 2, and the first small coil springs 7a are compressed between the fourth friction washer 85 and the second bushing 89. Once the torsional angle reaches the angle $\theta 1n$, the inner peripheral teeth 59 hit the outer peripheral teeth 55, and the first stopper 9 comes into play (FIG. 17). In this state, the gap angle $\theta 5n-\theta 1n(>0)$ is maintained between the second small coil springs 7b and the third cut-outs 89e. Accordingly, on the negative side the second small coil springs 7b are not compressed.

Also, the first low hysteresis torque Th1 is generated by the first small friction generating mechanism 15 until the torsional angle reaches the angle $\theta 1n$.

The result of the above operation is that the torsional characteristics of the first stage region of low hysteresis torque and low torsional stiffness are realized (FIG. 11).

4.2.2: Second and Third Stage Regions

When the input rotary member 2 rotates further to the R2 side from the state in FIG. 17, the input rotary member 2 rotates relatively with respect to the hub flange 6, and compression of the two large coil springs 8 held in the second windows 42 between the input rotary member 2 and the hub flange 6 commences. The two large coil springs 8 are compressed in parallel until the torsional angle is an angle of $\theta 1n+\theta 2n$.

As the relative rotation of the input rotary member 2 with respect to the spline hub 3 progresses, the four large coil springs 8 begin to be compressed (FIG. 19). When the torsional angle reaches an angle of $\theta 1n+\theta 3n$, the second stopper 10 comes into play, and the relative rotation of the input rotary member 2 and the spline hub 3 stops.

Also, when the input rotary member 2 and the hub flange 6 rotate relatively, high hysteresis torque is generated not only by the first small friction generating mechanism 15, but also by the large friction generating mechanism 14 (the second friction washer 72 and the fourth friction washer 85).

The result of the above operation is that the torsional characteristics of the second and third stage regions of high hysteresis torque and high torsional stiffness are realized (FIG. 11).

4.3: Operation for Minute Torsional Vibrations
4.3.1: Third and Fourth Stage Regions on Positive Side of Torsional Characteristics During vehicle acceleration (positive side of torsional characteristics), the damper mechanism 4 transmits torque, in a state in which the first stopper 9 and the second stopper 10 are operating (the state in FIG. 16, in which the torsional angle is an angle of $\theta 1p+\theta 3p$). In this state, when minute torsional vibrations originating in combustion fluctuations of the engine are inputted to the input rotary member 2, the stiff large coil springs 8 repeatedly expand and contract between the input rotary member 2 and the hub flange 6.

Figure 16:
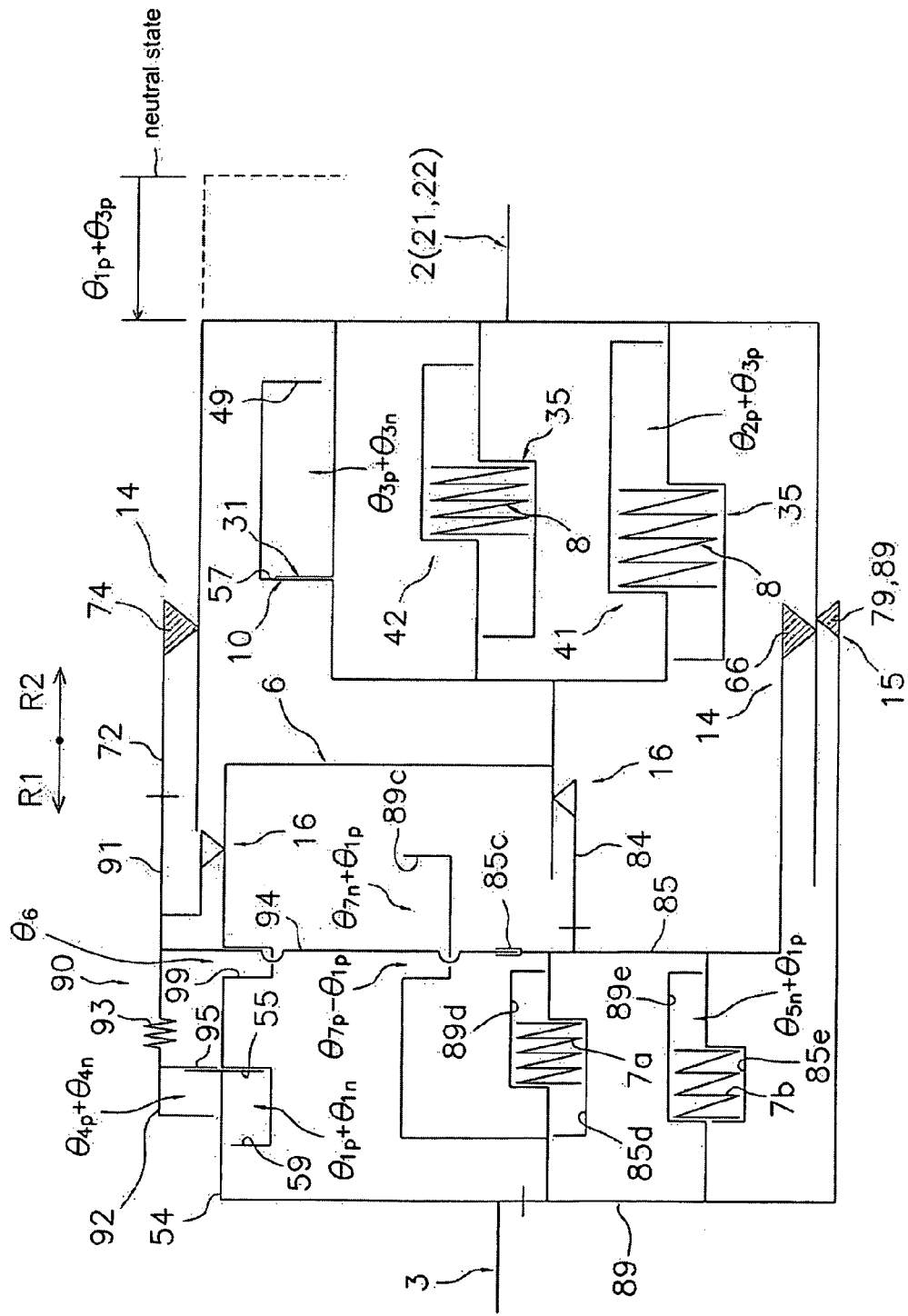
FIG. 16 is a mechanical circuit diagram of a damper mechanism which shows a first stopper and a second stopper operating.

Meanwhile, in the state in FIG. 16, as mentioned above, the linking components 93 of the first bushing 90 are compressed in the rotational direction, and this biasing force causes the first bushing 90 to function as an integral member with respect to the hub flange 6 and the spline hub 3. Accordingly, the first bushing 90, the second friction washer 72, and the fourth friction washer 85 repeatedly undergo relative rotation within a minute torsional angle range with the input rotary member 2. As a result, as shown in FIG. 11, high hysteresis torque Th2 is generated by the large friction generating mechanism 14 and the small friction generating mechanism 15 with respect to the minute torsional vibrations.

Thus, even if minute torsional vibrations should be inputted during acceleration, high hysteresis torque is always generated. Specifically, with this damper mechanism 4, no rotational direction gap is maintained that would prevent the generation of high hysteresis torque on the positive side of the torsional characteristics. Consequently, the generation of a resonance peak during acceleration is suppressed.

4.3.2: Second and Third Stage Regions on Negative Side of Torsional Characteristics During vehicle deceleration (negative side of torsional characteristics), the damper mechanism 4 transmits torque in a state in which the first stopper 9 and the second stopper 10 are operating (the state in FIG. 19, in which the torsional angle is an angle of $\theta 1n+\theta 3n$). In this state, when minute torsional vibrations are inputted to the input rotary member 2, the large coil springs 8 repeatedly expand and contract between the input rotary member 2 and the hub flange 6.

Meanwhile, in the state in FIG. 19, the linking components 93 of the first bushing 90 are not compressed in the rotational direction. Accordingly, unlike during acceleration, the first bushing 90, the second friction washer 72, and the fourth friction washer 85 are capable of relative rotation with respect to the hub flange 6 and the spline hub 3. When minute torsional vibrations are inputted to the input rotary member 2 in this state, no slip occurs in the large friction generating mechanism 14 that generates high hysteresis torque. Specifically, the input rotary member 2, the first bushing 90, the second friction washer 72, and the fourth friction washer 85 function as an integral member.

As a result, as shown in FIG. 11, within the range of the gap angle $\theta 6$ formed between the holes 99 and the protrusions 94, the first bushing 90, the second friction washer 72, and the fourth friction washer 85 rotate relatively, and the second low hysteresis torque Th3 is generated by the second small friction generating mechanism 16 (the first bushing 90 and the third friction washer 84). At this point the high hysteresis torque Th2 is hot generated within the range of the gap angle $\theta 6$.

Thus, even if minute torsional vibrations are inputted during acceleration, the generation of high hysteresis torque is suppressed within the range of the gap angle $\theta 6$.

5. Operation and Effect

With this damper mechanism 4, the elastic force of the linking components 93 of the first bushing 90 is utilized to generate the high hysteresis torque Th2 in all torsional vibration on one side (the positive side) of the torsional characteristics, while the generation of the high hysteresis torque Th2 can be prevented within the range of a specific torsional angle (the gap angle $\theta 6$) on the other side (the negative side) of the torsional characteristics. Consequently, with this damper mechanism 4, the structure can be simplified and manufacturing cost can be reduced.

Also, manufacturing cost can be further reduced by integrally forming the various components of the first bushing 90. The various deformation components 96 of the linking components 93 are particularly easy to form because they can be formed by punching out, etc., the slits 98 from a disk-shaped member.

Furthermore, with this damper mechanism 4, the first small coil springs 7a and the second small coil springs 7b used to achieve low torsional stiffness are disposed on the outer peripheral side of the spline hub 3 and between the hub flange 6 and the clutch plate 21 in the rotational direction. Accordingly, there is more latitude in the design of the first small coil springs 7a and the second small coil springs 7b than with a conventional structure (a structure in which coil springs are provided between a hub flange and a spline hub), and the vibration damping performance is improved.

6. Other Embodiments

The specific constitution of the present invention is not limited to that in the embodiment given above, and various modifications and changes are possible without departing from the scope of the invention.

With the above embodiment, the clutch disk assembly 1 in which the damper mechanism 4 was installed was described as an example, but the present invention is not limited to this. For instance, this damper mechanism can also be applied to a two-mass flywheel, a lock-up device for a fluid torque transmission device, or another such power transmission device.

Figure 20:
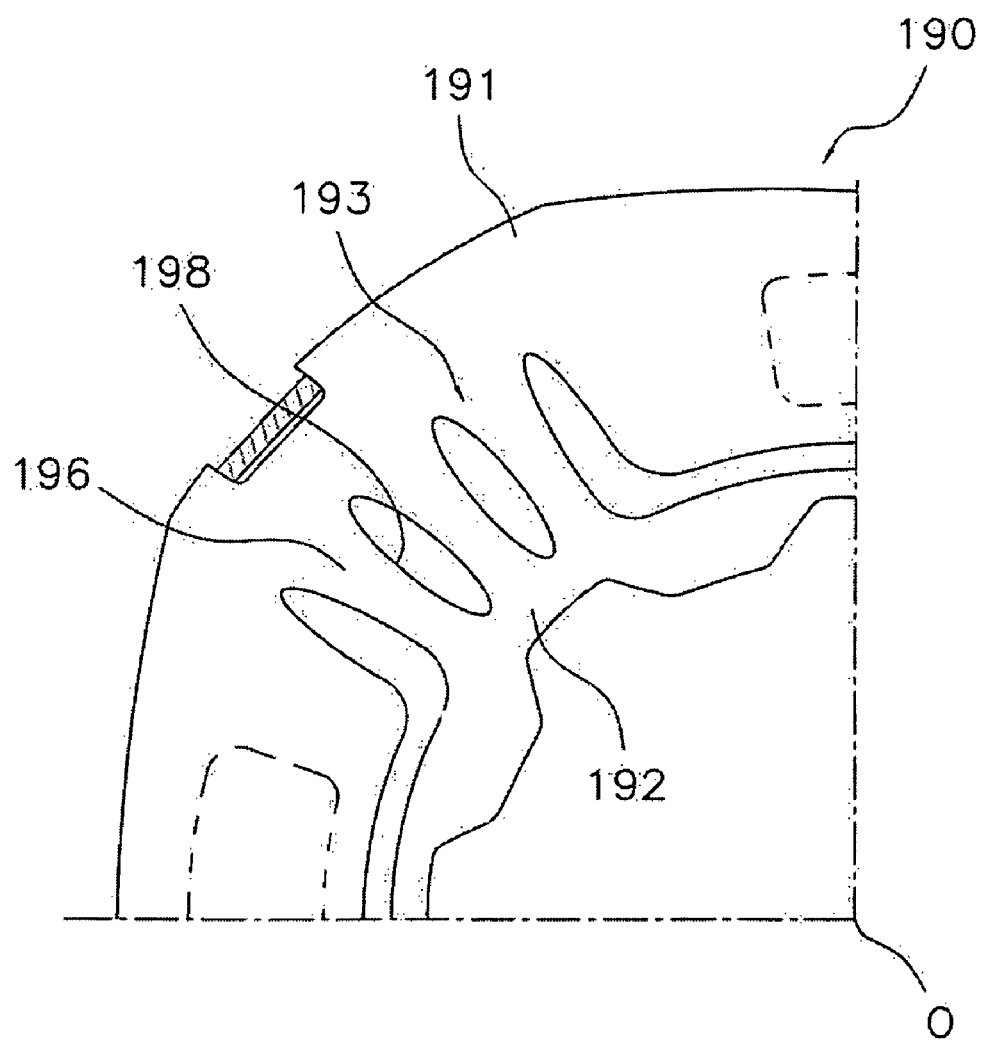
FIG. 20 is a simplified elevational view of a first bushing in another embodiment.

Also, the shape of the first bushing 90 is not limited to what was described above. For instance, the first bushing 190 shown in FIG. 20 can also be used. With this first bushing 190, deformation components 196 of linking components 193 extend in the radial direction, and are not curved like the above-mentioned deformation components 96. Also, slits 198 are elliptical in shape, for example. Here again, a first annular component 191 and a second annular component 192 can be elastically linked in the rotational direction, and the same effect as above can be obtained.

INDUSTRIAL APPLICABILITY

With the damper mechanism pertaining to the present invention, a structure is achieved in which high hysteresis torque is not generated with respect to torsional vibration, and manufacturing cost can be reduced.

The invention claimed is:

1. A damper mechanism, comprising:
a first rotary member;
a second rotary member being disposed rotatably within a range of a first angle with respect to the first rotary member;
a third rotary member being disposed rotatably with respect to the second rotary member;
an elastic member elastically linking the first and second rotating members in a rotational direction; and
a friction generating mechanism being disposed between the first and second rotating members and having a friction member frictionally engaging the first rotary member,
in a state in which the second rotary member is twisted to a first side in the rotational direction with respect to the third rotary member, the friction member being pressed in the rotational direction against the second rotary member in a state in which at least part of the friction member has been elastically deformed in the rotational direction, so that the friction member and the second rotary member function as an integral member in the rotational direction, and
in a state in which the second rotary member is twisted to a second side opposite to the first side in the rotational direction with respect to the third rotary member, the friction member being configured to rotate relatively with respect to the second rotary member within a range of a second angle that is smaller than the first angle.

2. The damper mechanism according to claim 1,
wherein the friction member has a first annular component that is disposed rotatably with respect to the second rotary member within the range of a second angle that is smaller than the first angle, a second annular component that is disposed rotatably with respect to the first annular component, and a linking component that elastically links the first and second annular components in the circumferential direction, and
in a state in which the first rotary member is twisted to one side in the rotational direction with respect to the second rotary member, the linking component is elastically deformed in the rotational direction between the first annular component and the second annular component.

3. The damper mechanism according to claim 2, wherein
the second rotary member has a hole passing through in the axial direction,
the first annular component has a protrusion that protrudes in the axial direction and that is inserted into the hole, and
the second angle is maintained in the rotational direction between the hole and the protrusion.

4. The damper mechanism according to claim 2, wherein
the second rotary member has an annular first main body component and a plurality of first inner peripheral teeth extending inward in the radial direction from the first main body component,
the third rotary member has an annular second main body component and a plurality of outer peripheral teeth extending outward in the radial direction from the second main body component,
the second annular component has a plurality of second inner peripheral teeth extending inward in the radial direction,
in a neutral state in which no torque is inputted, the third angle is maintained in the rotational direction between the first inner peripheral teeth and the outer peripheral teeth, and
the fourth angle is maintained in the rotational direction between the second inner peripheral teeth and the outer peripheral teeth.

5. The damper mechanism according to claim 2, wherein
the linking component is formed integrally with the first and/or second annular component.

6. The damper mechanism according to claim 2, wherein
the friction member further has a friction plate that is disposed and configured to move relatively in the axial direction and to rotate integrally with the first annular component, and that frictionally engages with the first rotary member.

7. The damper mechanism according to claim 2, wherein
the first annular component is disposed on the outer peripheral side of the second annular component, and
the linking component has a deformation component extending from the inner peripheral part of the first annular component to the outer peripheral part of the second annular component.

8. The damper mechanism according to claim 7, wherein
the deformation component has a curved component that is curved in a wave shape.

9. The damper mechanism according to claim 2, further comprising
the third rotary member disposed and configured to rotate relative with respect to the second rotary member,
wherein, in a state in which the first rotary member is twisted to one side in the rotational direction with respect to the third rotary member, the first annular component is pushed to one side in the rotational direction by the second rotary member, and the second annular component is pushed to the other side in the rotational direction by the third rotary member.

10. The damper mechanism according to claim 9, wherein
the second rotary member has a hole passing through in the axial direction,
the first annular component has a protrusion that protrudes in the axial direction and that is inserted into the hole, and
the second angle is maintained in the rotational direction between the hole and the protrusion.

11. The damper mechanism according to claim 9, wherein
the second rotary member has an annular first main body component and a plurality of first inner peripheral teeth extending inward in the radial direction from the first main body component,
the third rotary member has an annular second main body component and a plurality of outer peripheral teeth extending outward in the radial direction from the second main body component,
the second annular component has a plurality of second inner peripheral teeth extending inward in the radial direction,
in a neutral state in which no torque is inputted, the third angle is maintained in the rotational direction between the first inner peripheral teeth and the outer peripheral teeth, and
the fourth angle is maintained in the rotational direction between the second inner peripheral teeth and the outer peripheral teeth.

12. The damper mechanism according to claim 9, wherein
the first annular component is disposed on the outer peripheral side of the second annular component, and
the linking component has a deformation component extending from the inner peripheral part of the first annular component to the outer peripheral part of the second annular component.

13. The damper mechanism according to claim 12, wherein
the deformation component has a curved component that is curved in a wave shape.

14. The damper mechanism according to claim 9, wherein,
in a neutral state in which no torque is inputted, the second rotary member is configured to rotate with respect to the third rotary member within a range of a third angle to one side in the rotational direction, and
in a state in which the relative rotation of the first annular component to the other side in the rotational direction with respect to the second rotary member is limited, the second annular component is configured to rotate by a fourth angle that is smaller than the third angle to one side in the rotational direction with respect to the second rotary member.

15. The damper mechanism according to claim 14, wherein
the second rotary member has a hole passing through in the axial direction,
the first annular component has a protrusion that protrudes in the axial direction and that is inserted into the hole, and
the second angle is maintained in the rotational direction between the hole and the protrusion.

16. The damper mechanism according to claim 15, wherein
the second rotary member has an annular first main body component and a plurality of first inner peripheral teeth extending inward in the radial direction from the first main body component,
the third rotary member has an annular second main body component and a plurality of outer peripheral teeth extending outward in the radial direction from the second main body component,
the second annular component has a plurality of second inner peripheral teeth extending inward in the radial direction,
in a neutral state in which no torque is inputted, the third angle is maintained in the rotational direction between the first inner peripheral teeth and the outer peripheral teeth, and
the fourth angle is maintained in the rotational direction between the second inner peripheral teeth and the outer peripheral teeth.

17. The damper mechanism according to claim 16, wherein
the first annular component is disposed on the outer peripheral side of the second annular component, and
the linking component has a deformation component extending from the inner peripheral part of the first annular component to the outer peripheral part of the second annular component.

18. The damper mechanism according to claim 17, wherein
the deformation component has a curved component that is curved in a wave shape.

19. The damper mechanism according to claim 18, wherein
the linking component is formed integrally with the first and/or second annular component.

20. The damper mechanism according to claim 19, wherein
the friction member further has a friction plate that is disposed and configured to move relatively in the axial direction and to rotate integrally with the first annular component, and that frictionally engages with the first rotary member.

\* \* \* \* \*